(12) United States Patent
Zhang et al.

(10) Patent No.: US 11,943,478 B2
(45) Date of Patent: Mar. 26, 2024

(54) ALLOWING A MATRIX BASED INTRA PREDICTION BLOCK TO HAVE MULTIPLE TRANSFORM BLOCKS

(71) Applicant: Telefonaktiebolaget LM Ericsson (publ), Stockholm (SE)

(72) Inventors: Zhi Zhang, Solna (SE); Kenneth Andersson, Gävle (SE); Davood Saffar, Solna (SE); Rickard Sjöberg, Stockholm (SE); Jacob Ström, Stockholm (SE); Ruoyang Yu, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 152 days.

(21) Appl. No.: 17/760,924

(22) PCT Filed: Sep. 17, 2020

(86) PCT No.: PCT/SE2020/050867
§ 371 (c)(1),
(2) Date: Mar. 16, 2022

(87) PCT Pub. No.: WO2021/054885
PCT Pub. Date: Mar. 25, 2021

(65) Prior Publication Data
US 2022/0377378 A1    Nov. 24, 2022

Related U.S. Application Data

(60) Provisional application No. 62/902,635, filed on Sep. 19, 2019.

(51) Int. Cl.
*H04N 19/61* (2014.01)
*H04N 19/105* (2014.01)
(Continued)

(52) U.S. Cl.
CPC .......... *H04N 19/61* (2014.11); *H04N 19/105* (2014.11); *H04N 19/11* (2014.11); *H04N 19/122* (2014.11);
(Continued)

(58) Field of Classification Search
CPC .... H04N 19/105; H04N 19/11; H04N 19/122; H04N 19/132; H04N 19/159;
(Continued)

(56) References Cited

U.S. PATENT DOCUMENTS 11,277,637 B2 *   3/2022   Van der Auwera .... H04N 19/59
11,330,302 B2 *   5/2022   Jung ..................... H04N 19/176
(Continued)

OTHER PUBLICATIONS

Extended European Search Report, Extended European Search Report, Application No. 20864765.1, dated Oct. 5, 2023, 11 pages.
(Continued)

*Primary Examiner* — Peter D Le
(74) *Attorney, Agent, or Firm* — Sage Patent Group

(57) ABSTRACT

A method, decoder, and apparatus are provided. Responsive to a current block being a MIP predicted block, it is determined whether it has one or multiple transform blocks. A MIP weight matrix to be used to decode the current block is determined based on a MIP prediction mode. Responsive to the MIP predicted block having one transform block, the MIP predicted block is derived based on the MIP weight matrix and previously decoded elements in the bitstream. Responsive to the MIP predicted block having multiple transform blocks: deriving a first MIP predicted block is derived based on the MIP weight matrix and previously decoded elements in the bitstream and remaining MIP predicted blocks are derived based further on decoded (Continued)

elements in at least one decoded transform block of the current block. The MIP predicted block(s) are output for subsequent processing.

21 Claims, 15 Drawing Sheets

(51) Int. Cl.
| | |
|---|---|
| *H04N 19/11* | (2014.01) |
| *H04N 19/122* | (2014.01) |
| *H04N 19/132* | (2014.01) |
| *H04N 19/159* | (2014.01) |
| *H04N 19/167* | (2014.01) |
| *H04N 19/176* | (2014.01) |
| *H04N 19/70* | (2014.01) |

(52) U.S. Cl.
CPC ......... *H04N 19/132* (2014.11); *H04N 19/159* (2014.11); *H04N 19/167* (2014.11); *H04N 19/176* (2014.11); *H04N 19/70* (2014.11)

(58) Field of Classification Search
CPC .. H04N 19/167; H04N 19/176; H04N 19/593; H04N 19/61; H04N 19/70
See application file for complete search history.

(56) References Cited

U.S. PATENT DOCUMENTS

| | | | | |
|---|---|---|---|---|
| 11,451,784 | B2* | 9/2022 | Deng | H04N 19/105 |
| 11,589,038 | B2* | 2/2023 | Blasi | H04N 19/11 |
| 11,805,275 | B2* | 10/2023 | Deng | H04N 19/132 |
| 2006/0165183 | A1* | 7/2006 | Numajiri | H04N 19/523 |
| | | | | 375/E7.113 |
| 2007/0274388 | A1* | 11/2007 | Lee | H04N 19/577 |
| | | | | 375/E7.265 |
| 2011/0182357 | A1* | 7/2011 | Kim | H04N 19/182 |
| | | | | 375/240.12 |
| 2011/0228849 | A1* | 9/2011 | Nakagawa | H04N 19/593 |
| | | | | 375/E7.243 |
| 2012/0201303 | A1* | 8/2012 | Yang | H04N 19/147 |
| | | | | 375/240.14 |
| 2020/0322620 | A1* | 10/2020 | Zhao | H04N 19/44 |
| 2022/0030242 | A1* | 1/2022 | Toma | H04N 19/126 |
| 2022/0377378 | A1* | 11/2022 | Zhang | H04N 19/159 |
| 2023/0365717 | A1* | 11/2023 | Bernett | C07K 16/468 |

OTHER PUBLICATIONS

Jianle Chen, et al., Algorithm Description for Versatile Video Coding and Test Model 6 (VTM 6), Output Document of JVET.
International Search Report and Written Opinion of the International Searching Authority, PCT/SE2020/050867, dated Dec. 16, 2020, 16 pages.
Bross, et al. "Versatile Video Coding (Draft 5)"; 14. JVET meeting; the Joint Video Exploration Team of ISO/IEC JTC1/SC29/WG11 and ITU-TSG16, Mar. 19-27, 2019, Geneva, Switzerland, 406 pages.
Sullivan, et al. "Overview of the High Efficiency Video Coding (HEVC) Standard," IEEE Transactions on Circuits and Systems for Video Technology, vol. 22, No. 12, nstitute of Electrical and Electronics Engineers, US, Dec. 1, 2012, 20 pages.
Li, et al. "CE5 related: Implicit split process for intra SDC"; 7. JCT-3V meeting; the Joint Collaborative Team on 3D Video Coding Extension Development of ISO/IEC JTC1/SC29/WG11 and ITU-T SG.16), Jan. 11-17, 2014, San Jose, US, 9 pages.
Zhang, et al. "Non-CE3: Enable MIP prediction for 64xN or Nx64 blocks at maximum transform size 32"; 16. JVET meeting; the Joint video Exploration Team of ISO/IEC JTC/SC29/WG11 and ITU-T SG. 16; Oct. 1-11, 2019, Geneva, Switzerland, 5 pages.
Bross, et al. "Versatile Video Coding (Draft 6)"; 15. JVET meeting; the Joint Video Experts Team of ISO/IEC JTC1/SC29/WG11 and ITU-TSG16, Jul. 3 -12, 2019, Gothenburg, Sweden, 455 pages.

* cited by examiner

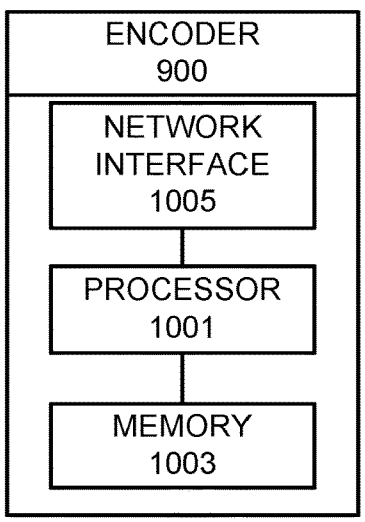

Figure 10

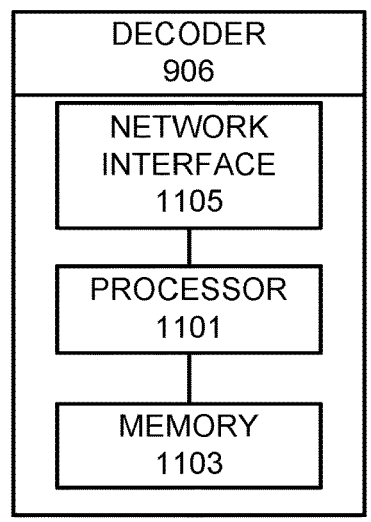

Figure 11

DERIVING A MAXIMUM TRANSFORM SIZE FROM DECODING ELEMENTS IN THE BITSTREAM
1401

DETERMINING WHETHER THE WIDTH VALUE IS LESS THAN OR EQUAL TO A MAXIMUM TRANSFORM SIZE DERIVED FROM DECODING ELEMENTS IN THE BITSTREAM AND WHETHER THE HEIGHT VALUE IS LESS THAN OR EQUAL TO THE MAXIMUM TRANSFORM SIZE
1403

RESPONSIVE TO THE WIDTH VALUE BEING LESS THAN OR EQUAL TO THE MAXIMUM TRANSFORM SIZE AND THE HEIGHT VALUE BEING LESS THAN OR EQUAL TO THE MAXIMUM TRANSFORM SIZE, DETERMINING THAT THERE IS ONE TRANSFORM BLOCK WITH A WIDTH NTBW EQUAL TO THE WIDTH VALUE AND A HEIGHT NTBH EQUAL TO THE HEIGHT VALUE
1405

RESPONSIVE TO THE WIDTH VALUE BEING GREATER THAN THE MAXIMUM TRANSFORM SIZE AND THE HEIGHT VALUE BEING GREATER THAN THE MAXIMUM TRANSFORM SIZE, DETERMINING THAT THERE ARE MULTIPLE TRANSFORM BLOCKS, EACH HAVING A WIDTH NTBW EQUAL TO A MINIMUM OF THE WIDTH VALUE AND THE MAXIMUM TRANSFORM SIZE AND A HEIGHT NTBH EQUAL TO A MINIMUM OF THE HEIGHT VALUE AND THE MAXIMUM TRANSFORM SIZE
1407

Figure 14

ALLOWING A MATRIX BASED INTRA PREDICTION BLOCK TO HAVE MULTIPLE TRANSFORM BLOCKS

CROSS REFERENCE TO RELATED APPLICATIONS

This application is a 35 U.S.C. § 371 national stage application of PCT International Application No. PCT/EP2020/050867 filed on Sep. 17, 2020, which in turn claims priority to U.S. Provisional Patent Application No. 62/902,635, filed on Sep. 19, 2019, the disclosures and content of which are incorporated by reference herein in their entireties.

TECHNICAL FIELD

This application relates to methods and apparatuses for video encoding and decoding.

BACKGROUND

HEVC and VVC

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on a block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VVC). At the time of writing, the current version of the VVC draft specification was "Versatile Video Coding (Draft 6)", JVET-O2001-vE. When VVC is referred in this document it refers to the Draft 6 of the VVC specification.

Components

A video sequence consists of a series of pictures where each picture consists of one or more components. Each component can be described as a two-dimensional rectangular array of sample values. It is common that a picture in a video sequence consists of three components; one luma component Y where the sample values are luma values, and two chroma components Cb and Cr, where the sample values are chroma values. It is common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components. In this document, we describe methods useful for the encoding and decoding of video sequences. However, it should be understood that the techniques described can also be used for encoding and decoding of still images.

Blocks and Units

A block is a two-dimensional array of samples. In video coding, each component is split into blocks and the coded video bitstream is a series of blocks. Typically, in video coding, the image is split into units that cover a specific area of the image. Each unit consists of all blocks from all components that make up that specific area and each block belongs to one unit. The macroblock in H.264 and the Coding unit (CU) in High Efficiency Video Coding (HEVC) are examples of units. It is common in video coding that the picture is split into units that cover a specific area. Each unit consists of all blocks that make up that specific area and each block belongs fully to only one unit. The coding unit (CU) in HEVC and VVC is an example of such a unit. A coding tree unit (CTU) is a logical unit which can be split into several CUs.

In HEVC, CUs are squares, i.e., they have a size of N×N luma samples, where N can have a value of 64, 32, 16 or 8. In the current H.266 test model Versatile Video Coding (VVC), CUs can also be rectangular, i.e. have a size of N×M luma samples where N is different to M.

Intra Prediction

There are two types of sample predictions: intra prediction and inter prediction. Intra prediction predicts blocks based on spatial extrapolation of samples from previously decoded blocks of the same (current) picture. It can also be used in image compression, i.e., compression of still images where there is only one picture to compress/decompress. Inter prediction predicts blocks by using samples for previously decoded pictures.

Intra Directional Prediction

Intra directional prediction is utilized in HEVC and VVC. In HEVC, there are 33 angular modes and 35 modes in total. In VVC, there are 65 angular modes and 67 modes in total. The remaining two modes, "planar" and "DC" are non-angular modes. Mode index 0 is used for the planar mode, and mode index 1 is used for the DC mode. The angular prediction mode indices range from 2 to 34 for HEVC and from 2 to 66 for VVC.

Intra directional prediction is used for all components in the video sequence, i.e. luma component Y, chroma components Cb and Cr.

Matrix based intra prediction (MIP)

Matrix based intra prediction is a coding tool that is included in the current version of the VVC draft. For predicting the samples of a current block of width W and height H, matrix based intra prediction (MIP) takes one column of H reconstructed neighbouring boundary samples to the left of the current block and one row of W reconstructed neighbouring samples above the current block as input. The predicted samples for the current block are derived based on the following three steps:

For both the neighboring row and column boundary, two or four samples may be extracted by averaging samples for each boundary ($bdry_{top}$ and $bdry_{left}$) using an averaging method that depends on the current block dimension. The extracted averaged boundary samples are named as reduced boundary $bdry_{red}$.

A matrix vector multiplication may be carried out using the extracted averaged boundary samples as input. The output is a reduced prediction signal consisting of a set of predicted sample values where each predicted sample corresponds to a position in the current block, and where the set of positions is a subset of all positions of the current block. The output reduced prediction signal is named as $pred_{red}$.

The prediction sample values for the remaining positions in the current block that is not in the set of positions may be generated from the reduced prediction signal by linear interpolation which is a single step linear interpolation in each direction (vertical and horizontal). The prediction signal consists of all prediction sample values for the block. The order of interpolation depends on the relative width and height of the block. For example:

If H>W, the horizontal linear interpolation is first applied by using the reduced left boundary samples which are named as $bdry_{red}^{left}$ or $bdry_{redII}^{left}$ depending on the current block dimension. A vertical linear interpolation is applied after horizontal linear interpolation by using the original top boundary bdrytop. Depending on the block size, the horizontal and/or the vertical linear interpolation may not be carried out for a block as illustrated in FIGS. 1-6.

If H·W, the vertical linear interpolation is first applied by using the reduced top boundary samples which are named as $bdry_{red}^{top}$ or $bdry_{red}^{top}$ depending on the current block dimension. A horizontal linear interpolation is applied after vertical linear interpolation by using the original left boundary $bdry_{left}$. Depending on the block size, the horizontal and/or the vertical linear interpolation may not be carried out for a block as illustrated in FIGS. 1-6.

Given a 4×4 block, the $bdry_{red}$ contains 4 samples which are derived from averaging every two samples of each boundary. The dimension of $pred_{red}$ is 4×4, which is same as the current block. Therefore, the horizontal and vertical linear interpolation can be skipped. FIG. 1 shows an example of MIP process for a 4×4 block.

Given an 8×4 block, the $bdry_{red}$ contains 8 samples which are derived from the original left boundary and averaging every two samples of the top boundary. The dimension of $pred_{red}$ is 4×4. The prediction signal at the remaining positions is generated from the horizontal linear interpolation by using the original left boundary $bdry_{left}$. FIG. 2 shows an example of MIP process for an 8×4 block.

Given a W×4 block, where W·16, the $bdry_{red}$ contains 8 samples which may be derived from the original left boundary and averaged every W·4 samples of the top boundary. The dimension of $pred_{red}$ is 8×4. The prediction signal at the remaining positions is generated from the horizontal linear interpolation by using the original left boundary $bdry_{left}$.

Given a 4×8 block, the $bdry_{red}$ contains 8 samples which are derived from averaging every two samples of the left boundary and the original top boundary. The dimension of $pred_{red}$ is 4×4. The prediction signal at the remaining positions is generated from the vertical linear interpolation by using the original top boundary $bdry_{top}$.

Given a 4×H block, where H·16, the $bdry_{red}$ contains 8 samples which are derived from averaging every H·4 samples of the left boundary and the original top boundary. The dimension of $pred_{red}$ is 4×8. The prediction signal at the remaining positions is generated from the vertical linear interpolation by using the original top boundary $bdry_{top}$. FIG. 3 shows an example of MIP process for a 4×16 block.

Given an 8×8 block, the $bdry_{red}$ contains 8 samples which are derived from averaging every two samples of each boundary. The dimension of $pred_{red}$ is 4×4. The prediction signal at the remaining positions is generated from firstly the vertical linear interpolation by using the reduced top boundary $bdry_{red}^{top}$, secondly the horizontal linear interpolation by using the original left boundary $bdry_{left}$. FIG. 4 shows an example of the MIP process for an 8×8 block.

Given a W×8 block, where W·16, the $bdry_{red}$ contains 8 samples which are derived from averaging every two samples of left boundary and averaging every W·4 samples of top boundary. The dimension of $pred_{red}$ is 8×8. The prediction signal at the remaining positions is generated from the horizontal linear interpolation by using the original left boundary $bdry_{left}$. FIG. 5 shows an example of MIP process for a 16×8 block.

Given an 8×H block, where H·16, the $bdry_{red}$ contains 8 samples which are derived from averaging every H·4 samples of the left boundary and averaging every two samples of the top boundary. The dimension of $pred_{red}$ is 8×8. The prediction signal at the remaining positions is generated from the vertical linear interpolation by using the original top boundary $bdry_{top}$.

Given a W×H block, where W·16 and H·16, the $bdry_{red}$ contains 8 samples which may be derived from:

For H·W, firstly, $bdry_{redII}^{top}$ contains 8 samples that are derived by averaging every W·8 samples of top boundary. Secondly, $bdry_{red}$ contains 8 samples may be derived from averaging every H·4 samples of the left boundary and averaging every two samples of the $bdry_{redII}^{top}$.

For H>W, firstly $bdry_{redII}^{left}$ contains 8 samples are derived by averaging every H 8 samples of left boundary. Secondly, the $bdry_{red}$ contains 8 samples may be derived from averaging every two of the $bdry_{redII}^{left}$ and every W·4 samples of the top boundary.

The dimension of $pred_{red}$ is 8×8. The prediction signal at the remaining positions is generated by using linear interpolation:

For H·W, firstly the vertical linear interpolation by using the reduced top boundary samples $bdry_{redII}^{top}$, which are derived by averaging every W·8 samples of top boundary, secondly the horizontal linear interpolation by using the original left boundary $bdry_{left}$.

For H>W, firstly the horizontal linear interpolation by using the reduced left boundary samples $bdry_{redII}^{left}$, which may be derived by averaging every H·8 samples of top boundary, secondly the vertical linear interpolation by using the original top boundary $bdry_{top}$.

FIG. 6 shows an example of MIP process for a 16×16 block:

In the current version of VVC, the MIP is applied for the luma component only.

In the current version of VVC, given a W×H block, the MIP can be applied to the current block when W·H or H·W ratio is equal or less than 4. In another word, the MIP is disabled to a block which has a dimension: 4×32, 32×4, 4×64, 64×4, 8×64 or 64×8.

MIP weight matrix kernel and MipSizeId

The MIP weight matrix kernel is the matrix that is used for MIP matrix multiplication. The MIP weight matrix kernels may be stored in a look-up table.

In the current version of VVC, there are three types of MIP weight matrix kerns. The type of MIP weight matrix kernel is specified by MipSizeId which ranges from 0 to 2. In other words, when the MipSizeId is determined, the type of MIP weight matrix kernel is selected by the determined MipSizeId.

MipSizeId is a variable that may be used to determine the number of input samples of reduced boundary, the number of output samples of reduced prediction and the MIP weight matrix to be used for the current block.

In the current version of VVC, the MipSizeId is determined by the dimension of the current block. Given a W×H block, the MipSizeId is determined by:

If both W and H are equal to 4, MipSizeId is set equal to 0

Otherwise, if both W and H are less than or equal to 8, MipSizeId is set to 1

Otherwise, MipSizeId is set to 2

MIP Prediction Mode

The MIP prediction mode specifies the indices of a MIP weight matrix in matrix look-up table. In the current version of VVC, the number of MIP prediction mode is specified by MipSizeId as:

If MipSizeId is equal to 0, number of MIP modes is 35
If MipSizeId is equal to 1, number of MIP modes is 19
If MipSizeId is equal to 2, number of MIP modes is 11

In the current version of VVC, given a W×H block, the number of MIP modes is equal to 0. Thus, in other words, MIP is not allowed for the current block when:

W·H is greater than 4
H·W is greater than 4

The MIP weight matrix to be used for MIP prediction is derived from a matrix look-up table by using MipSizeId and MIP mode Id. For example, when MipSizeId is equal to 0 and MIP mode Id is equal to 0, the MIP weight matrix, size M×N where M is equal to 16 and N is equal to 4, is derived as:

```
{
{ 37, 59, 77, 28}, { 32, 92, 85, 25}, { 31, 69, 100, 24},
{ 33, 36, 106, 29}, { 24, 49, 104, 48}, { 24, 21, 94, 59},
{ 29, 0, 80, 72}, { 35, 2, 66, 84}, { 32, 13, 35, 99},
{ 39, 11, 34, 103}, { 45, 21, 34, 106}, { 51, 24, 40, 105},
{ 50, 28, 43, 101}, { 56, 32, 49, 101}, { 61, 31, 53, 102},
{ 61, 32, 54, 100}
},
```

The MIP weight matrix is 2-D matrix. The size of a MIP matrix can be represented as M×N, where N is equal to the number of input samples of $bdry_{red}$ (MIP INPUT) and M is equal or greater than the number of output samples of $pred_{red}$ (MIP OUTPUT). The matrix multiplication of the MIP weight matrix with the input vector yields a vector of M samples which are spatially located in a square matrix with size predC, where M=predC×predC.

The MIP OUTPUT is a 2-D matrix which has a dimension of predW×predH. The size of MIP OUTPUT can be represented as predW×predH.

The size of MIP INPUT and MIP OUTPUT depends on the MipSizeId. Table 1 shows the size of MIP INPUT, MIP OUTPUT and the size of MIP weight matrix for each MipSizeId:

TABLE 1

The size of MIP INPUT, MIP OUPUT and the size of MIP weight matrix for each MipSizeId

| MipSizeId | MIP INPUT size | predW | predH | predC | N |
|---|---|---|---|---|---|
| 0 | 4 | 4 | 4 | 4 | 4 |
| 1 | 8 | 4 | 4 | 4 | 8 |
| 2 | 8 | min (TbW, 8) | min (TbH, 8) | 8 | 8 |

The TbW specifies the width of the transform block, the TbH specifies the height of the transform block. It can be detected that the MIP OUTPUT dimension predW×predH depends on the transform block dimension TbW×TbH.

In the current version of VVC, given a W×H block, where W specifies the current block width also known as cbWidth, H specifies the current block height also known as cbHeight. The maximum luma transform block size is MaxTbSizeY. The MIP is disable when cbWidth>MaxTbSizeY or cbHeight>MaxTbSizeY.

In other words, in the current version of VVC, a MIP coded block has a dimension is equal or less than MaxTbSizeY×MaxTbSizeY.

transform block and Coding block and Prediction block

The coding block is the root node of two trees, the prediction tree and the transform tree. The prediction tree specifies the position and size of prediction blocks. The transform tree specifies the position and size of transform blocks. The splitting information for luma and chroma is identical for the prediction tree and may or may not be identical for the transform tree.

In other words:
A transform block has a dimension that is equal or less than a coding block which is the root node of the transform block.
A prediction block has a dimension that is equal or less than a coding block which is the root node of the prediction block.

One example that a transform block has a dimension is less than a coding block is that when the MaxTbSizeY is less than the coding unit width or height. The coding block is implicitly split into N transform blocks with both sides equal or smaller than MaxTbSizeY.

FIG. 7 shows a non-exhaustive set of examples where the CU or block before the split has at least one side equal to 64 and the set MaxTbSizeY is equal to 32. These sizes are just example numbers. For a CU or block with both sides larger than MaxTbSizeY, the CU or block is split along two dimensions such that the output transform blocks does not have any side larger than MaxTbSizeY.

Another example that a transform block has a dimension is less than a coding block is that the Intra Sub-partition (ISP). When ISP is applied to a coding block, the coding block is split into 2 or 4 transform blocks. FIG. 8 shows an example of one coding block is split into 2 to 4 sub-partitioned blocks.

SUMMARY

One problem that may occur in the current version of VVC is that given a W×H MIP predicted coding block, where W specifies the width of the coding block and H specifies the height of the coding block, the W is equal or less than MaxTbSizeY, the H is equal or less than MaxTbSizeY, where MaxTbSizeY specifies the maximum transform size. In other words, when W is greater than MaxTbSizeY or H is greater than MaxTbSizeY, the current block can NOT be coded as a MIP predicted block.

This restriction of MIP prediction impacts the coding efficiency when a video encoder or decoder has a configuration that the maximum coding block size is greater than the maximum transform size.

According to some embodiments of inventive concepts, a method is provided to operate a decoder. The method includes determining a width and a height of a current block of a bitstream based on syntax elements in the bitstream. The method further includes determining whether the current block is an intra predicted block. The method further includes responsive to the current block being an intra predicted block, determining whether the intra predicted block is a matrix based intra prediction, MIP, predicted block. The method further includes responsive to the current block being a MIP predicted block, determining whether the MIP predicted block has one transform block or multiple transform blocks. The method further includes determining a MIP weight matrix to be used to decode the current block based on a MIP prediction mode of the current block. The method further includes responsive to determining that the MIP predicted block has one transform block: deriving the MIP predicted block based on the MIP weight matrix and previously decoded elements in the bitstream. The method further includes responsive to determining that the MIP predicted block has multiple transform blocks: deriving a first MIP predicted block based on the MIP weight matrix and previously decoded elements in the bitstream; and deriving remaining MIP predicted blocks based on the MIP weight matrix and previously decoded elements in the bitstream and decoded elements in at least one decoded transform block of the current block. The method further includes outputting the MIP predicted block or the first MIP predicted block and remaining predicted blocks for subsequent processing by the decoder.

Decoder and computer program products having analogous operations are provided.

A potential advantage of the inventive concepts is enabling the MIP prediction when the current coding block has a width or height that is greater than the maximum transform size. The benefit improves the coding efficiency by using MIP on coding blocks which has a width or height that is greater than the maximum transform size.

According to other embodiments of inventive concepts, a method is performed by a processor of a decoder. The method includes deriving a size of a current coding block of a picture from a bitstream as a width value and a height value based on decoding syntax elements in the bitstream. The method further includes responsive to the current coding block being an intra predicted block, determining whether the current coding block is a MIP predicted block from decoding elements in the bitstream. The method further includes determining whether the current coding block has one transform block or has multiple transform blocks. The method further includes determining a matrix vector to use for the current coding block from a matrix vector look-up table by using a prediction mode for the current coding block and a value based on the width value and the height value of the current coding block as a table index. The method further includes determining original boundary sample values for the current transform block. The method further includes determining a size of a reduced boundary $bdry_{red}$ by the value based on the width value and the height value of the current coding block. The method further includes determining a dimension size of a reduced prediction signal $pred_{red}$ by the value based on the width value and the height value of the current coding block. The method further includes deriving the reduced boundary $bdry_{red}$ from the original boundary samples. The method further includes The method further includes deriving a reduced prediction signal $pred_{red}^{temp}$ by matrix multiplication of the matrix vector and the reduced boundary $bdry_{red}$. The method further includes deriving the reduced prediction signal $pred_{red}$ by using sample value clipping on each sample of the $pred_{red}^{temp}$. The method further includes The method further includes The method further includes determining whether to apply vertical linear interpolation to the reduced prediction signal $pred_{red}$ and whether to apply horizontal linear interpolation to the reduced prediction signal $pred_{red}$. The method further includes applying interpolation based on the determination of whether to apply vertical linear interpolation to the reduced prediction signal $pred_{red}$ and whether to apply horizontal linear interpolation to the reduced prediction signal $pred_{red}$. The method further includes determining one of a size of a reduced top boundary $bdry_{redII}^{top}$ and a size of the reduced left boundary $bdry_{redII}^{left}$ based on interpolation applied. The method further includes determining one of reduced top boundary $bdry_{redII}^{top}$ and reduced left boundary $bdry_{redII}^{left}$ based on the interpolation applied. The method further includes decoding the current coding block by using each of the MIP prediction blocks.

Decoders and computer program products that perform analogous operations are provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 10 is a block diagram is a block diagram illustrating an encoder according to some embodiments;
FIG. 11 is a block diagram illustrating a decoder according to some embodiments;
FIGS. 12-15 are flow charts illustrating operations of a decoder or an encoder in accordance with some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
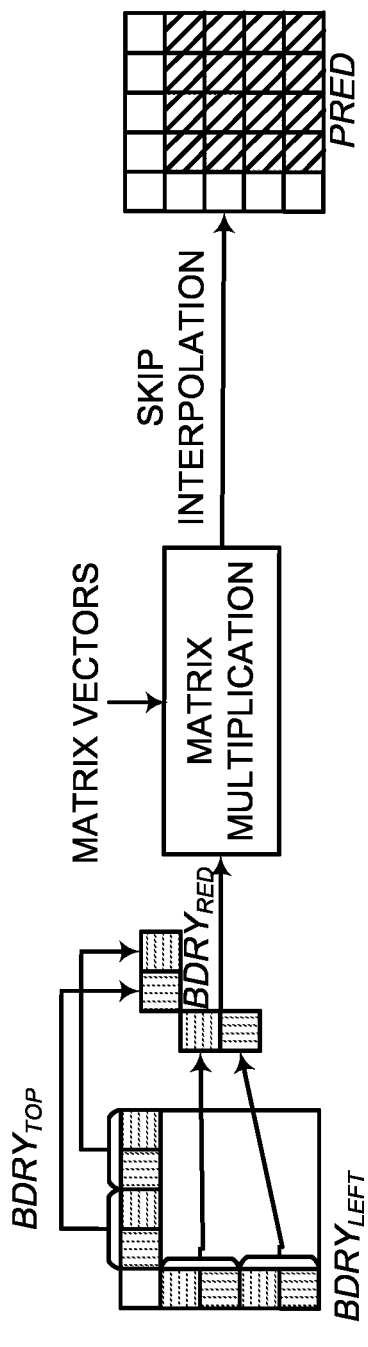
FIG. 1 is an illustration of a MIP process for a 4×4 block.
Figure 2:
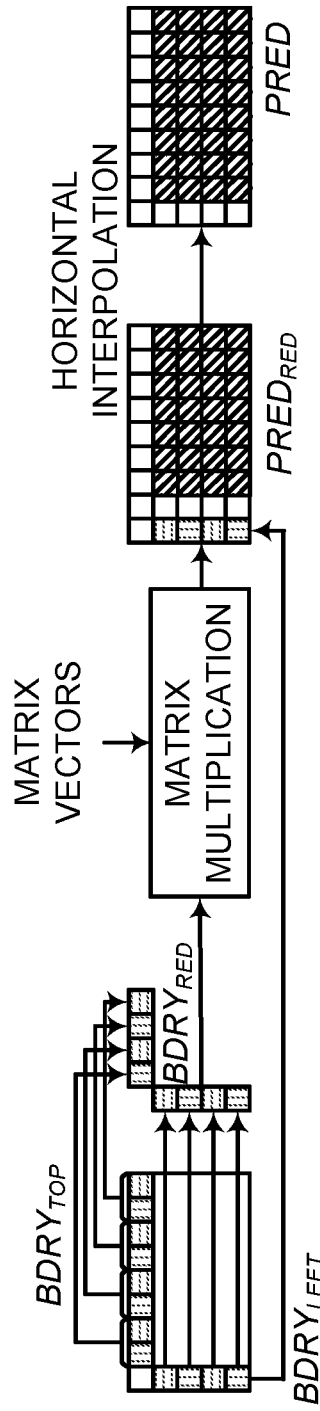
FIG. 2 is an illustration of a MIP process for an 8×4 block.
Figure 3:
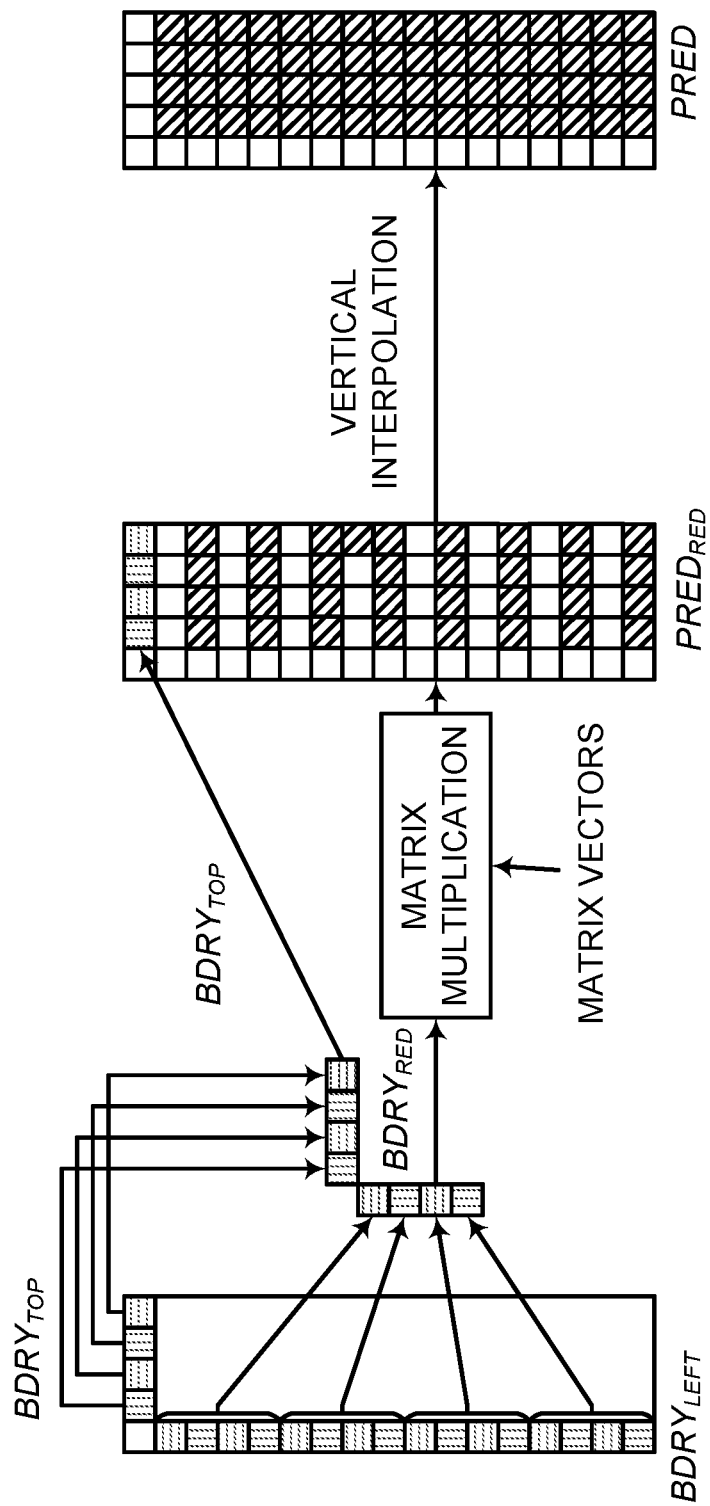
FIG. 3 is an illustration of a MIP process for a 4×16 block.
Figure 4:
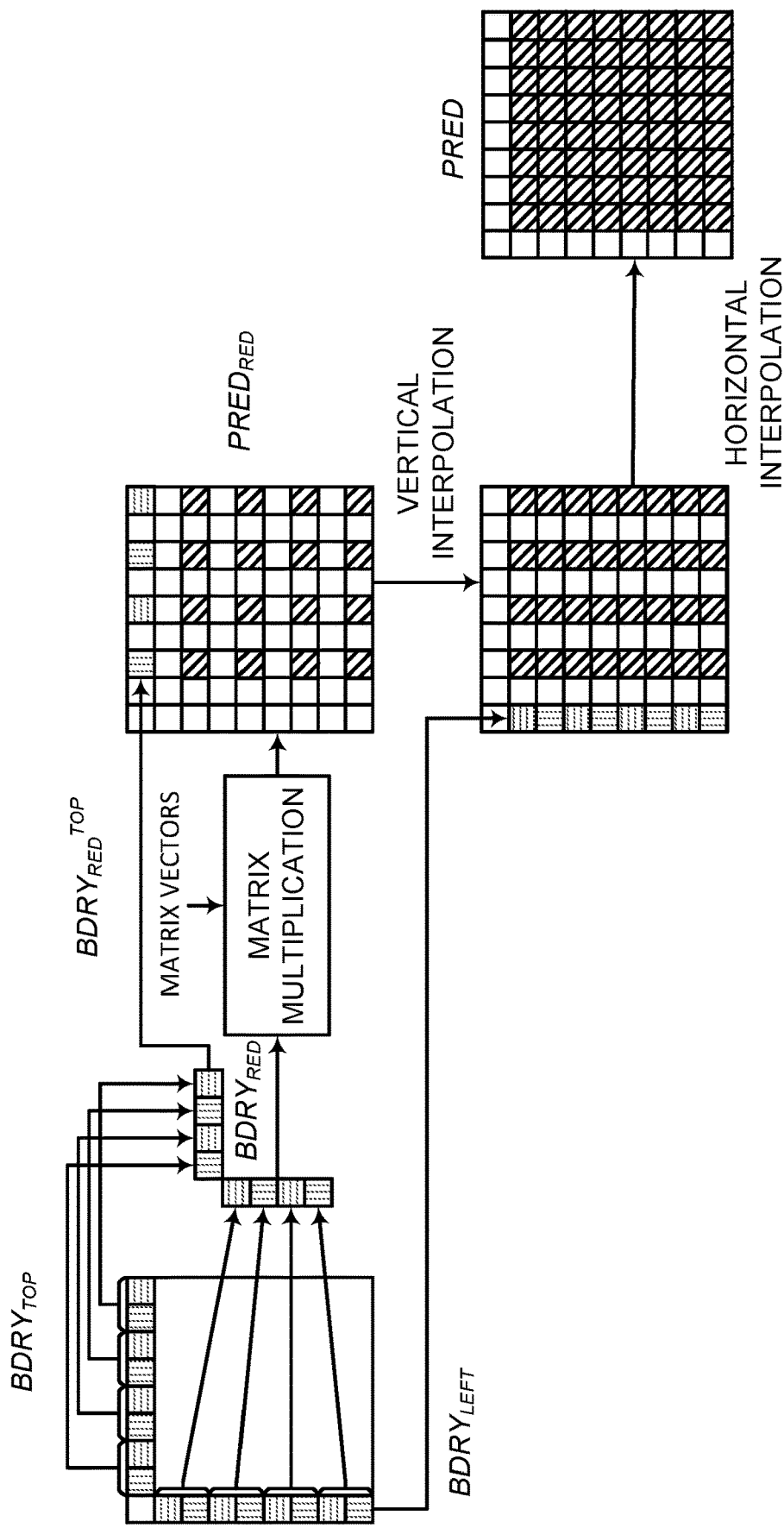
FIG. 4 is an illustration of a MIP process for an 8×8 block.
Figure 5:
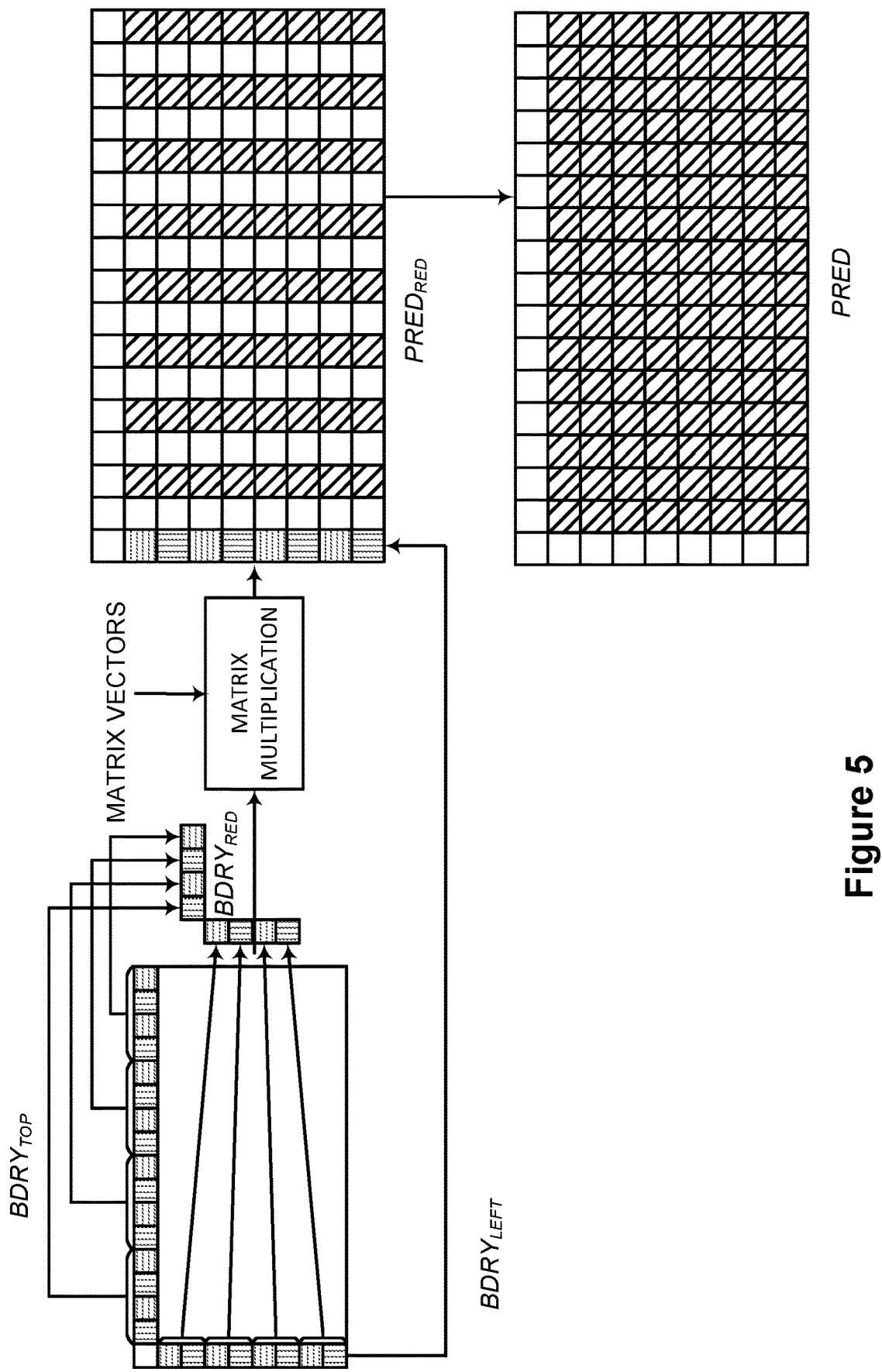
FIG. 5 is an illustration of a MIP process for a 16×8 block.
Figure 6:
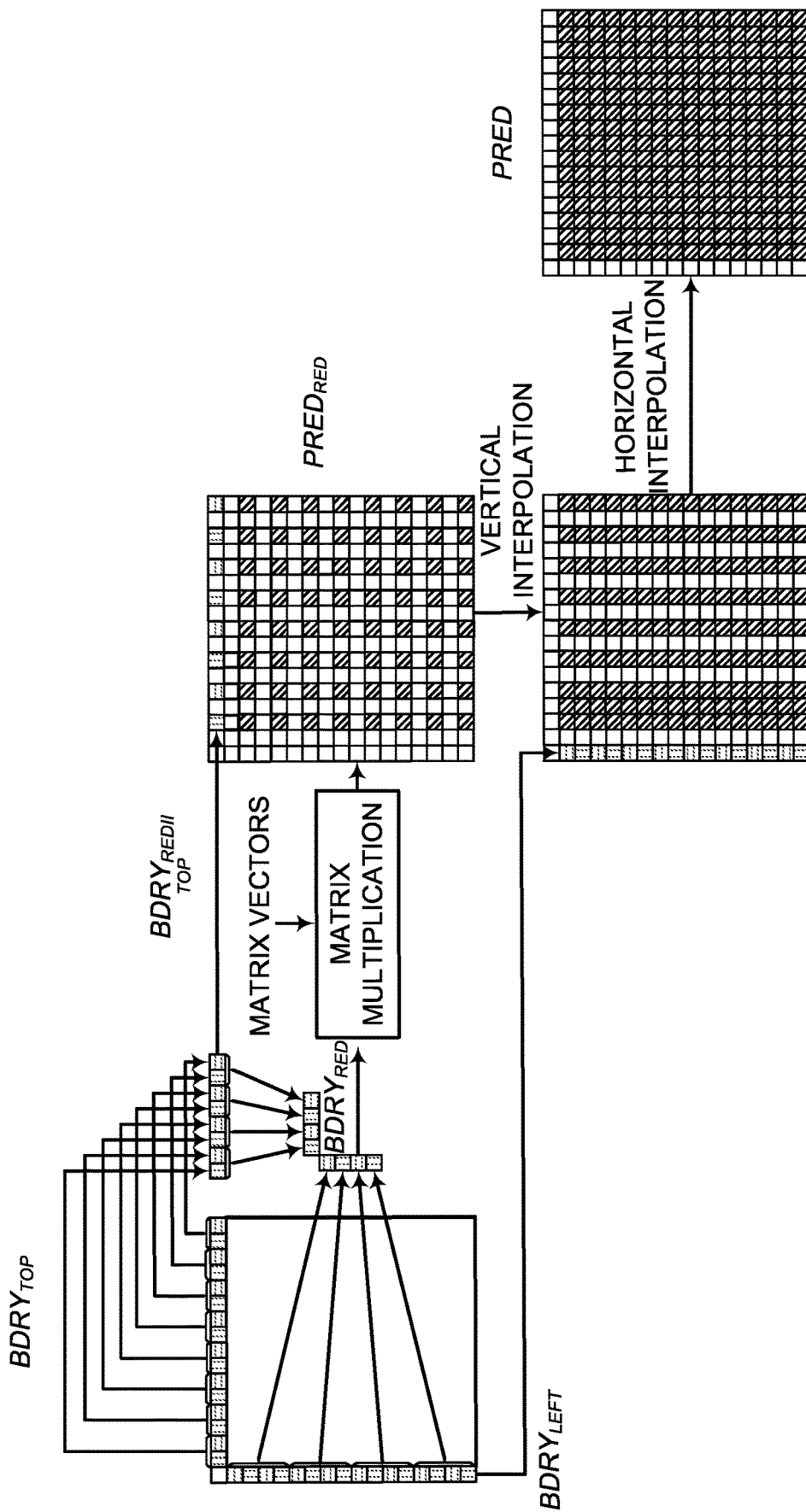
FIG. 6 is an illustration of a MIP process for a 16×16 block.
Figure 7:
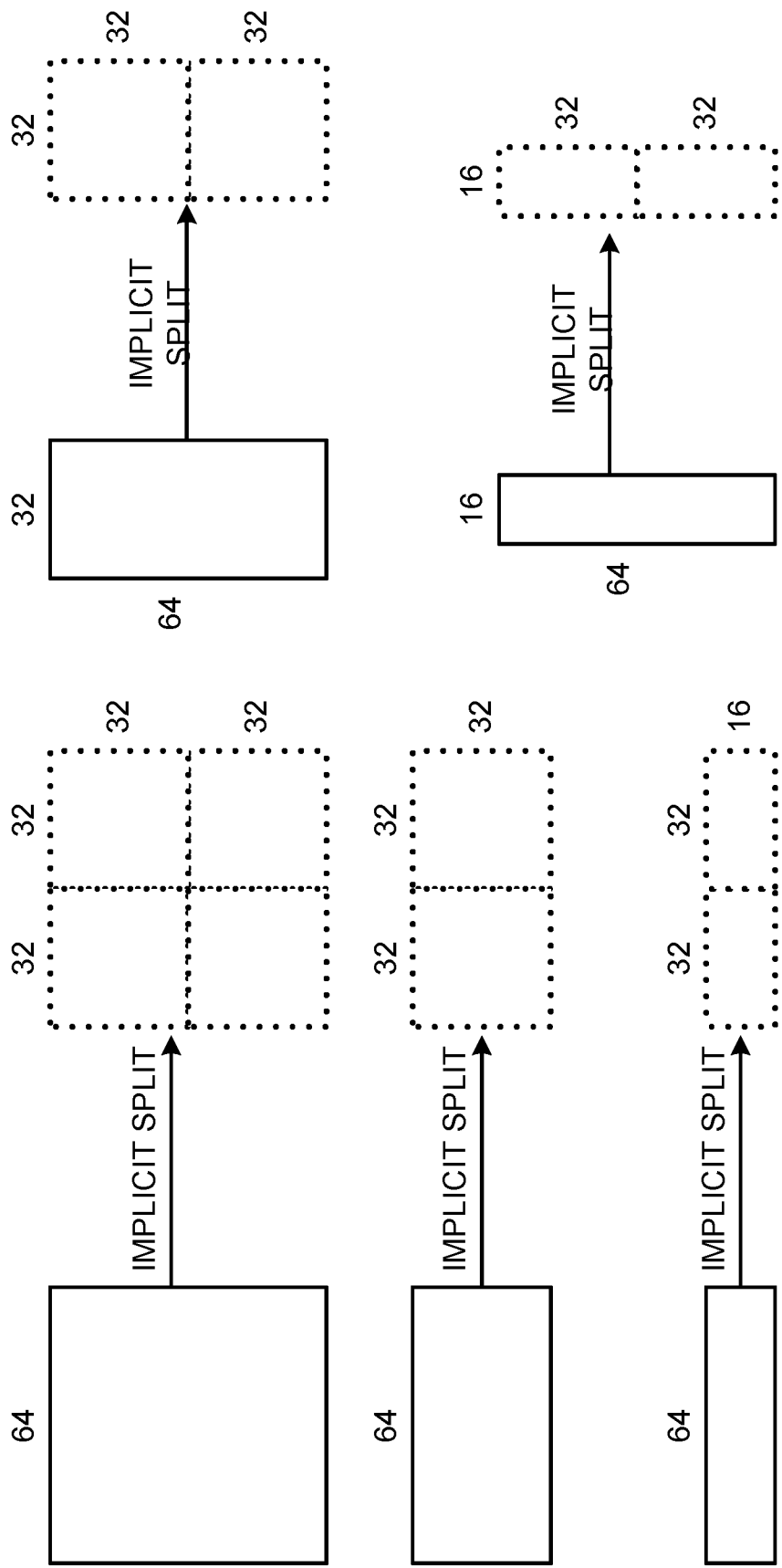
FIG. 7 is an example of an implicit transform split when the maximum transform size is set to 32.
Figure 8:
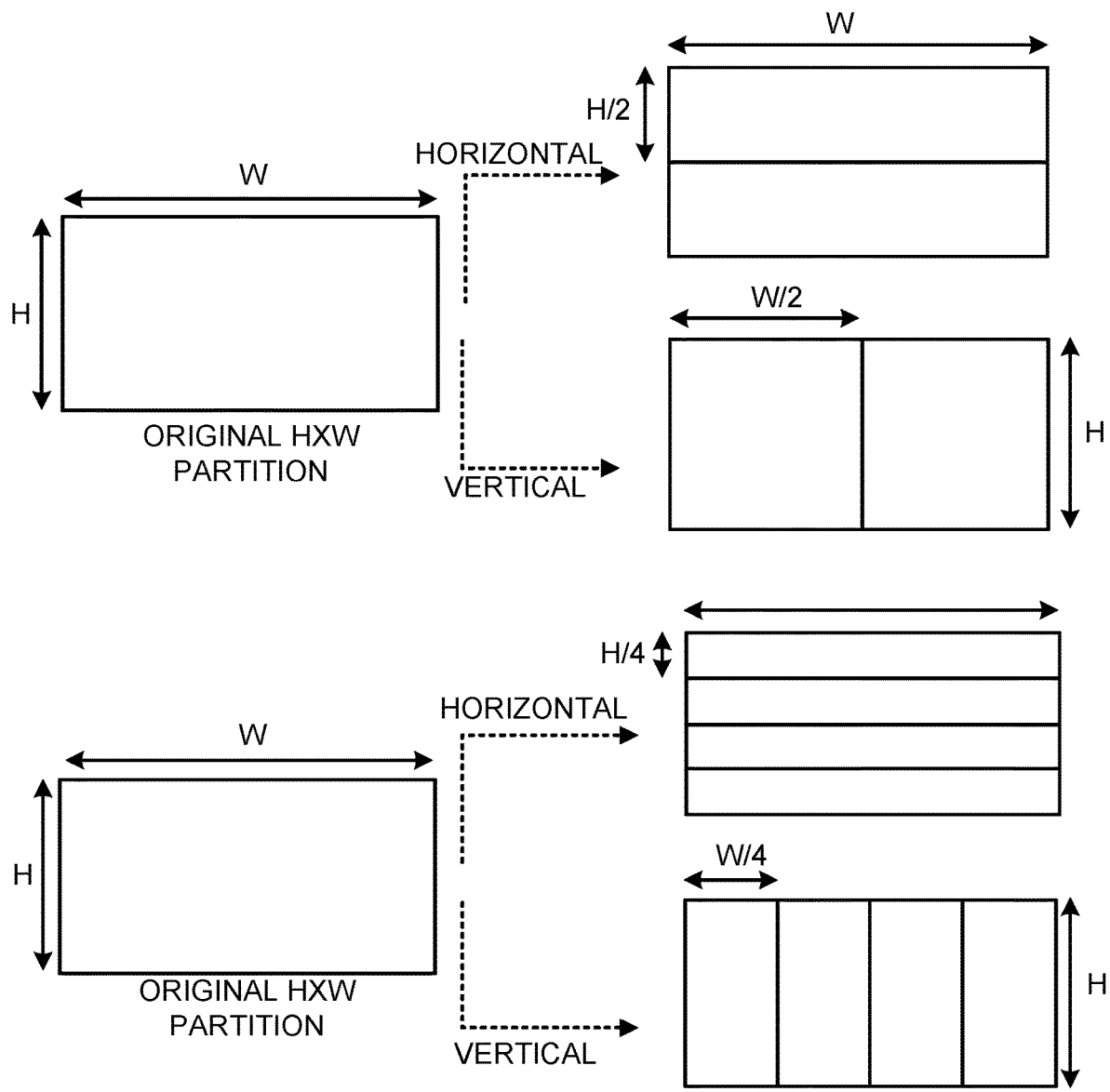
FIG. 8 is an example of one block divided into 2 or 4 sub-partitions.
Figure 9:
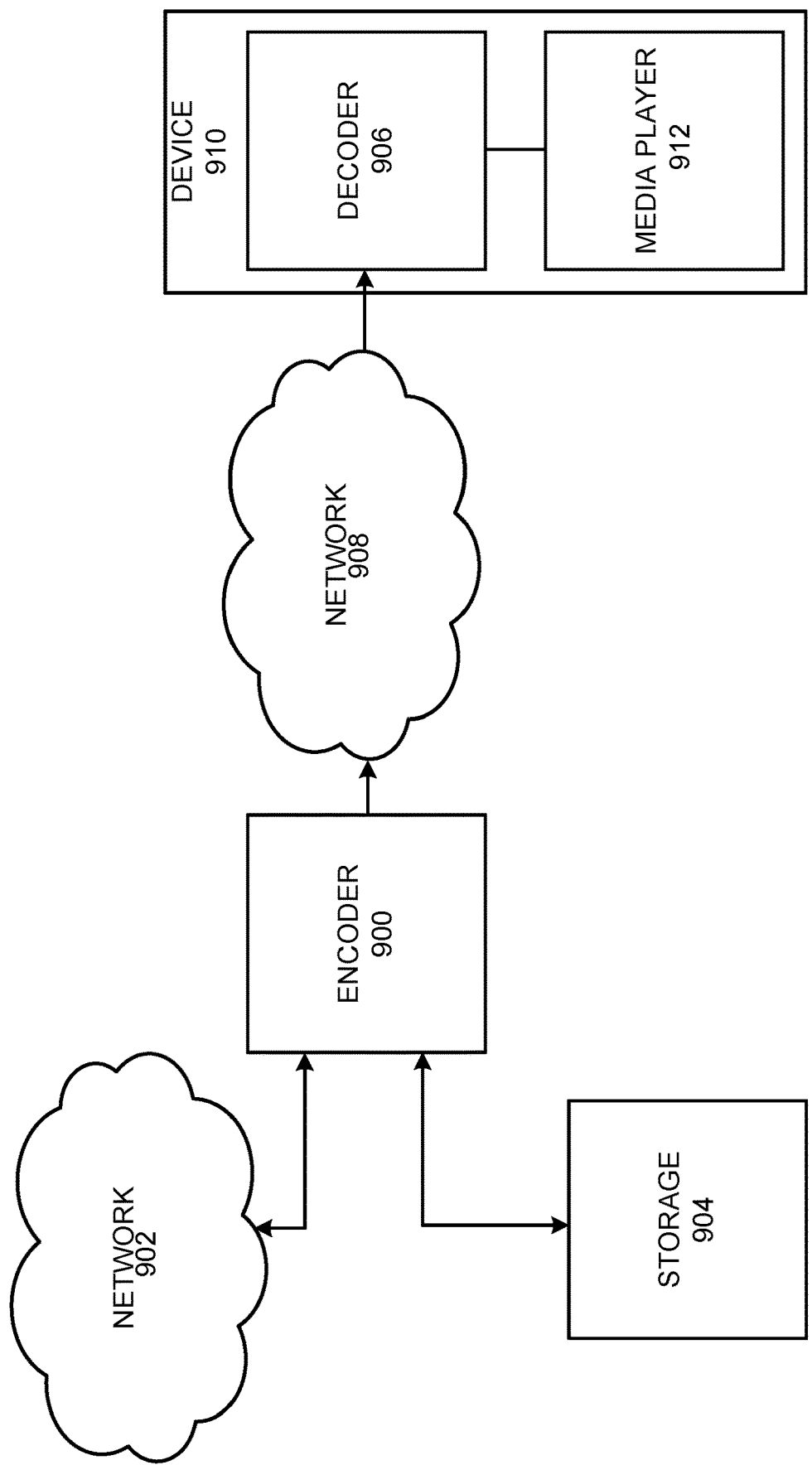
FIG. 9 is a block diagram illustrating an example of an environment of a system in which the encoder and decoder may be implemented according to some embodiments of inventive concepts.

FIG. 9 illustrates an example of an operating environment of an encoder 900 that may be used to encode bitstreams as described herein. The encoder 900 receives video from network 902 and/or from storage 904 and encodes the video into bitstreams and transmits the encoded video to decoder 906 via network 908. Storage device 904 may be part of a storage depository of multi-channel audio signals such as a storage repository of a store or a streaming video service, a separate storage component, a component of a mobile device, etc. The decoder 906 may be part of a device 910 having a media player 912. The device 910 may be a mobile device, a set-top device, a desktop computer, and the like. In other embodiments, functionality of the decoder 910 may be distributed across multiple devices.

FIG. 10 is a block diagram illustrating elements of encoder 900 configured to encode video frames according to some embodiments of inventive concepts. As shown, encoder 900 may include a network interface circuit 1005 (also referred to as a network interface) configured to provide communications with other devices/entities/functions/etc. The encoder 900 may also include a processor circuit 1001 (also referred to as a processor) coupled to the network interface circuit 1005, and a memory circuit 1003 (also referred to as memory) coupled to the processor circuit. The memory circuit 1003 may include computer readable program code that when executed by the processor circuit 1001 causes the processor circuit to perform operations according to embodiments disclosed herein.

According to other embodiments, processor circuit 1001 may be defined to include memory so that a separate memory circuit is not required. As discussed herein, operations of the encoder 900 may be performed by processor 1001 and/or network interface 1005. For example, processor 1001 may control network interface 1005 to transmit communications to decoder 906 and/or to receive communications through network interface 1002 from one or more other network nodes/entities/servers such as other encoder nodes, depository servers, etc. Moreover, modules may be stored in memory 1003, and these modules may provide instructions so that when instructions of a module are executed by processor 1001, processor 1001 performs respective operations.

FIG. 11 is a block diagram illustrating elements of decoder 906 configured to decode video frames according to some embodiments of inventive concepts. As shown, decoder 906 may include a network interface circuit 1105 (also referred to as a network interface) configured to provide communications with other devices/entities/functions/etc. The decoder 906 may also include a processor circuit 1101 (also referred to as a processor) coupled to the network interface circuit 1105, and a memory circuit 1103 (also referred to as memory) coupled to the processor circuit. The memory circuit 1103 may include computer readable program code that when executed by the processor circuit 1101 causes the processor circuit to perform operations according to embodiments disclosed herein.

According to other embodiments, processor circuit 1101 may be defined to include memory so that a separate memory circuit is not required. As discussed herein, operations of the decoder 906 may be performed by processor 1101 and/or network interface 1105. For example, processor 1101 may control network interface 1105 to receive communications from encoder 900. Moreover, modules may be stored in memory 1103, and these modules may provide instructions so that when instructions of a module are executed by processor 1101, processor 1101 performs respective operations.

One problem that may occur in the current version of VVC is that given a W×H MIP predicted coding block, where W specifies the width of the coding block and H specifies the height of the coding block, the W is equal or less than MaxTbSizeY, the H is equal or less than MaxTbSizeY, where MaxTbSizeY specifies the maximum transform size. In other words, when W is greater than MaxTbSizeY or H is greater than MaxTbSizeY, the current block can NOT be coded as a MIP predicted block.

This restriction of MIP prediction impacts the coding efficiency when a video encoder or decoder has a configuration that the maximum coding block size is greater than the maximum transform size.

The inventive concepts described herein allow the MIP predicted block when the current coding block has a width value that is greater than the maximum transform size or the current block has a height value that is greater than the maximum transform size. Thus, a MIP predicted coding block which has multiple transform blocks is allowed.

One advantage that may be achieved is enabling the MIP prediction when the current coding block has a width or height that is greater than the maximum transform size. The benefit improves the coding efficiency by using MIP on coding blocks which has a width or height that is greater than the maximum transform size. An example in VVC has been implemented using the VTM6.0 as reference VVC software. As in the third embodiment, compared to the current software configuration, the maximum transform size is configured to be equal to 32 for this case.

| | All Intra Over VTM-6.0 (maximum transform size = 32) | | | | |
|---|---|---|---|---|---|
| | Y | U | V | EncT | DecT |
| Class A1 | −0.04% | 0.03% | 0.00% | 101% | 102% |
| Class A2 | 0.00% | −0.08% | −0.02% | 101% | 103% |
| Class B | 0.00% | 0.02% | 0.04% | 101% | 98% |
| Class C | 0.00% | 0.01% | 0.00% | 101% | 100% |
| Class E | −0.05% | −0.02% | −0.16% | 99% | 100% |
| Overall | −0.02% | 0.00% | −0.02% | 100% | 101% |
| Class D | 0.00% | 0.00% | −0.01% | 100% | 101% |
| Class F | 0.02% | −0.02% | −0.06% | 101% | 101% |

| | Random Access Over VTM-6.0 (maximum transform size = 32) | | | | |
|---|---|---|---|---|---|
| | Y | U | V | EncT | DecT |
| Class A1 | −0.10% | −0.20% | −0.33% | 100% | 100% |
| Class A2 | 0.00% | −0.10% | −0.03% | 100% | 100% |
| Class B | −0.01% | −0.12% | 0.00% | 100% | 100% |
| Class C | −0.2% | −0.06% | −0.01% | 100% | 101% |
| Class E | | | | | |
| Overall | −0.03% | −0.11% | −0.08% | 100% | 100% |
| Class D | 0.01% | −0.07% | 0.01% | 100% | 101% |
| Class F | 0.02% | 0.13% | −0.06% | 100% | 98% |

In the description that follows, the term "sample" may be interpreted as "sample value". For example, a sentence "Derive X from the Y samples" may be interpreted as "Derive X from the Y sample values". Similarly, a sentence "The X samples are derived by Y" may be interpreted as "The X sample values are derived by Y". The term "MIP INPUT" can be interpreted as "The extracted reduced boundary $bdry_{red}$ which is used as the input to the matrix multiplication". The term "MIP OUTPUT" can be interpreted as "The reduced prediction signal $pred_{red}$ which is the output of the matrix multiplication".

In a first embodiment, a method for video encoding or decoding for a current intra predicted block is provided. The method can preferably be applied for a block which is coded by matrix based intra prediction (MIP).

The method may derive the size of the current CU as a width value W and height value H by decoding syntax elements in the bitstream.

The method may also determine that the current block is an Intra predicted block from decoding elements in the bitstream.

The method determines whether the current CU has a syntax element of mipFlag in the bitstream by checking one or several criteria. In other words, the method determines that the current CU has to encode a syntax element of mipFlag into the bitstream or the current CU has to decode a syntax element of mipFlag from the bitstream by checking one or several criteria.

If the method identifies that the current CU has a syntax element in the bitstream, it determines that the current block is a MIP predicted block from decoding elements in the bitstream.

The method determines a MIP weight matrix to be used for the current block from a matrix look-up table by using the width and height of the current coding block and the MIP prediction mode of the current coding block.

The method derives the maximum transform size MaxTbSizeY from decoding elements in the bitstream.

The method determines that the current MIP predicted coding block has one transform block or multiple transform blocks by checking:

If W is equal to or less than MaxTbSizeY and H is equal to or less than the MaxTbSizeY, there is one transform block.

Otherwise, there are multiple transform blocks.

When it is determined that there is one transform block, the method may derive the MIP prediction block by using the determined MIP weight matrix and previously decoded elements in the bitstream.

When it is determined that there are multiple transform blocks, the method may derive the first MIP prediction block by using the determined MIP weight matrix and previously decoded elements in the bitstream. The method derives the rest of the prediction blocks by using the determined MIP weight matrix and previously decoded elements in the bitstream and decoded elements in one or several previously decoded transform blocks in the current coding block.

The method may derive the current block by using the derived one or several MIP prediction blocks.

In a second embodiment, when the method determines that the current block is an Intra predicted block, it determines that the current CU has a syntax element of mipFlag in the bitstream. In other words, if the current block is an Intra predicted block, there is always a syntax element of mipFlag in the bitstream.

In a third embodiment, when the method determines that the current block is an Intra predicted block, it determines that the current CU has a syntax element of mipFlag in the bitstream by checking the following criteria:

The current CU does NOT have a syntax element of mipFlag in the bitstream if:
  a. W is greater than (T_whRatio×H), OR
  b. H is greater than (T_whRatio×W), Otherwise, the current CU has a syntax element of mipFlag in the bitstream. Here, T_whRatio specifies a constant parameter, and as an example T_whRatio is equal to 4.

r In a fourth embodiment, if the method determines that the current block is an Intra predicted block, it determines that the current CU has a syntax element of mipFlag in the bitstream by checking the following criteria:

The current CU does NOT have a syntax element of mipFlag in the bitstream if:
  c. W is greater than (T_whRatio×H), OR
  d. H is greater than (T_whRatio×W), OR
  e. W is greater than a pre-determined threshold T, OR
  f. H is greater than a pre-determined threshold T Otherwise, the current CU has a syntax element of mipFlag in the bitstream. Here, T_whRatio specifies a constant parameter, and as an example T_whRatio is equal to 4. Also, the threshold T is a constant parameter, and as an example the threshold T is equal to 64.

r In a fifth embodiment, the method described above can be applied in an encoder and/or decoder of a video or image coding system. In other words, a decoder may execute the method described here by all or a subset of the following steps to decode an intra predicted block in a picture from a bitstreams:

1. Derive the size of the current CU as a width value W and height value H by decoding syntax elements in the bitstream.
2. Determine that the current block is an Intra predicted block from decoding elements in the bitstream.
3. Determine whether the current block has a supported MIP predicted block size or not:
   a. The current block can NOT be predicted as MIP block if:
      i. W is greater than (T_whRatio×H), OR
      ii. H is greater than (T_whRatio×W), OR
      iii. W is greater than a pre-determined threshold T, OR
      iv. H is greater than a pre-determined threshold T
   b. Otherwise, the current block can be predicted as MIP block.
4. If the method determines that the current block can be predicted as a MIP block, it determines that the current block is a MIP predicted block from decoding elements in the bitstream.
5. Determine a prediction mode for the current block from decoding elements in the bitstream.
6. Derive a mipSizeId value from the width value W and height value H of the current CU.
7. Determine a matrix vector to use for the current block from a matrix vector look-up table by using the prediction mode and the mipSizeId value as a table index.
8. Derive a maximum transform size MaxTbSizeY from decoding elements in the bitstream.
9. Determine that the current CU has one transform block or has multiple transform blocks by checking the following criteria:
   a. If W is equal to or less than the MaxTbSizeY and H is equal to or less than the MaxTbSizeY, there is one transform block. Where the transform block has its width nTbW=W and its height nTbH=H.
   b. Otherwise, there are multiple transform blocks. Where each transform block has its width nTbW=min(W, MaxTbSizeY) and its height nTbH=min(H, MaxTbSizeY).
10. Determine the original boundary sample values for the current block. The original boundary samples are nTbW samples from the nearest neighboring samples to the above of the current transform block and nTbH samples from the nearest neighboring samples to the left of the current transform block.
11. Determine the size of the reduced boundary bdryred by the mipSizeId value of the current block.

12. Determine the dimension size of the reduced prediction signal $pred_{red}$ by the mipSizeId value of the current block.
13. Derive the reduced boundary bdryred from the original boundary samples.
14. Derive the reduced prediction signal $pred_{red}^{temp}$ by matrix multiplication of the matrix vector and the reduced boundary $bdry_{red}$.
15. Derive the reduced prediction signal $pred_{red}$ by using sample value clipping on each sample of the $pred_{red}^{temp}$.
16. Determine whether or not to apply vertical linear interpolation to the reduced prediction signal $pred_{red}$ by the width nTbW and the height nTbH of the current transform block.
17. Determine whether or not to apply horizontal linear interpolation to the reduced prediction signal $pred_{red}$ by the width nTbW and the height nTbH of the current transform block.
18. If the decision is to apply both vertical and horizontal linear interpolations,
    a. By using the width nTbW and the height nTbH of the current transform block, determine which linear interpolation direction to apply first.
    b. If the decision is to first apply vertical linear interpolation,
       i. Determine the size of the reduced top boundary $bdry_{redII}^{top}$ for the vertical linear interpolation by the width nTbW and the height nTbH of the current transform block.
       ii. Derive the reduced top boundary $bdry_{redII}^{top}$ from the original top boundary samples.
    c. If the decision is to first apply horizontal linear interpolation,
       i. Determine the size of the reduced left boundary $bdry_{redII}^{left}$ for the horizontal linear interpolation by the width nTbW and the height nTbH of the current transform block.
       ii. Derive the reduced left boundary $bdry_{redII}^{left}$ from the original left boundary samples.
19. Derive a first MIP prediction block pred by generating the sample values at the remaining positions by using linear interpolation.
20. If in step 9 it determines that there are multiple transform blocks in the current CU, repeat step 10 to 19 to derive a second MIP prediction block for each transform block in the current CU.
21. Decode the current block by using the derived one or several MIP prediction blocks.

In a sixth embodiment, an example of change the current VVC draft text (response to Embodiment 3) is provided. The changes (strikethrough and double underline) to the current VVC draft text (ref JVET-02001-vE) for the MIP process for one embodiment (embodiment 2) of the current invention is as follows:

7.3.8.5 Coding Unit Syntax

| | Descriptor |
|---|---|
| coding_unit x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag) { | |
|     if treeType != DUAL_TREE_CHROMA && | |
|     !(( ( cbWidth = = 4 && cbHeight = = 4 ) modeType = = MODE_TYPE_INTRA ) | |
|       && !sps_ibc_enabled_flag )) | |
|       cu_skip_flag[ x0 ][ y0 ] | ae(v) |
|     if cu_skip_flag[ x0 ][ y0 ] = = 0 && slice_type != I | |
|       && !( cbWidth = = 4 && cbHeight = = 4 ) && modeType = = MODE_TYPE_ALL ) | |
|       pred_mode_flag | ae(v) |
|     if( ((( slice_type = = I && cu_skip_flagl x0 ][ y0 ] = =0 ) | |
|       ( slice_type != I && ( CuPredMode[ chType ][ x0 ][ y0 ] != MODE_INTRA \|\| | |
|       ( cbWidth = = 4 && cbHeight = = 4 && cu_skip_flag[ x0 ][ y0 ] = = 0 ))) ) && | |
|       cbWidth <= 64 && cbHeight <= 64 && modeType != MODE_TYPE_INTER && | |
|       sps_ibc_enabled_flag && treeType != DUAL_TREE_CHROMA) | |
|     pred_mode_ibc_flag | ae(v) |
|     if( ((( slice_type = = \|\| ( cbWidth = = 4 && cbHeight = = 4 ) \|\| sps_ibc_enabled_flag) && | |
|       CuPredMode[ x0 ][ y0 ] = = MODE_INTRA ) \|\| | |
|       (slice_type != I && !( cbWidth = = 4 && cbHeight = = 4) && \|\| sps_ibc_enabled_flag | |
|       && CuPredMode[ x0 ][ y0 ] != MODE_INTRA ) ) && sps_palette_enabled_flag && | |
|       cbWidth <= 64 && cbHeight <= 64 && && cu_skip_flagl x0 ][ y0 ] = = 0 && | |
|       modeType != MODE_INTER) | |
|     pred_mode_plt_flag | ae(v) |
|   } | |
|   if( CuPredMode[ chType ][ x0 ][ y0 ] = = MODE_INTRA \|\| | |
|     CuPredMode[ chType ][ x0 ][ y0 ] = = MODE_PLT) { | |
|     if( treeType = = SINGLE_TREE \|\| treeType = = DUAL_TREE_LUMA) { | |
|       if( pred_mode_plt_flag) { | |
|         if treeType = = DUAL_TREE_LUMA ) | |
|           palette_coding( x0, y0, cbWidth, cbHeight, 0, 1 ) | |
|         else /* SINGLE_TREE */ | |
|           palette_coding( x0, y0, cbWidth, cbHeight, 0, 3 ) | |
|       } else { | |
|         if( sps_bdpcm_enabled_flag && | |
|           cbWidth <= MaxTsSize && cbHeight <= MaxTsSize ) | |
|           intra_bdpcm_flag | ae(v) |

|  |  |
|---|---|
| if( intra_bdpcm_flag ) | |
|     intra_bdpcm_dir_flag | ae(v) |
| } else { | |
|   if( sps_mip_enabled_flag && | |
|     ~~( Abs( Log2( cbWidth ) ) • Log2( cbHeight ) ) <= 2 ) &&~~ | |
|     ~~CbWidth <= MaxTbSizeY && cbHeight <= MaxTbSizeY )~~ | |
|     <u>Abs( Log2( cbWidth ) •Log2( cbHeight )) <= 2 )</u> | |
|     intra_mip_flag[ x0 ][ y0 ] | ae(v) |
|   if( intra_mip_flag[ x0 ][ y0 ]) | |
|     intra_mip_mode[ x0 ][ y0 ] | ae(v) |
|   else { | |
|     if( sps_mrl_enabled_flag && ( ( y0 % CtbSizeY ) > 0 )) | |
|       intra_luma_ref_idx[ x0 ][ y0 ] | ae(v) |
|     if ( sps_isp_enabled_flag && intra_luma_ref_idx[ x0 ][ y0 ] = = 0 && | |
|       ( cbWidth <= MaxTbSizeY && cbHeight <= MaxTbSizeY ) && | |
|       ( cbWidth * cbHeight > MinTbSizeY * MinTbSizeY )) | |
|       intra_subpartitions_mode_flag[ x0 ][ y0 ] | ae(v) |
|     if( intra_subpartitions_mode_flag[ x0 ][ y0 ] = = 1 ) | |
|       intra_subpartitions_split _flag[ x0 ][ y0 ] | ae(v) |
|     if( intra_luma_ref_idx[ x0 ][ y0 ] = = 0 ) | |
|       intra_luma_mpm_flag[x0][y0] | ae(v) |
|     if( intra_luma_mpm_flag[ x0 ][ y0 ] ) { | |
|       if( intra_luma_ref_idx[ x0 ][ y0 ] = = 0 ) | |
|         intra_luma_not_planar_flag[ x0 ][ y0 ] | ae(v) |
|       if( intra_luma_not_planar_flag[ x0 ][ y0 ]) | |
|         intra_luma_mpm_idx[ x0 ][ y0 ] | ae(v) |
|     } else | |
|       intra_luma_mpm_remainder[ x0 ][ y0 ] | ae(v) |
|     } | |
|   } | |
| } | |
| } | |
| if (treeType = = SINGLE_TREE || treeType = = DUAL_TREE_CHROMA) && | |
|   ChromaArrayType != 0 ) { | |
|   if ( pred_mode_plt_flag && treeType = = DUAL_TREE_CHROMA ) | |
|     palette_coding( x0, y0, cbWidth / SubWidthC, cbHeight / SubHeightC, 1, 2 ) | |
|   else { | |
|     if( CclmEnabled ) | |
|       cclm_mode_flag | ae(v) |
|     if( cclm_mode_flag ) | |
|       cclm_mode_idx | ae(v) |
|     else | |
|       intra_chroma_pred_mode | ae(v) |
|   } | |
| } | |
| } else if treeType != DUAL_TREE_CHROMA) { /* MODE_INTER or MODE_IBC */ | |
|   if( cu_skip_flag[ x0 ][ y0 ] = = 0 ) | |
|     general_merge_flag[ x0 ][ y0 ] | ae(v) |
|   if( general_merge_flag[ x0 ][ y0 ] ) { | |
|     merge_data( x0, y0, cbWidth, cbHeight, chType ) | |
|   } else if ( CuPredMode[ chType ][ x0 ][ y0 ] = = MODE_IBC ) { | |
|     mvd_coding( x0, y0, 0, 0 ) | |
|     if( MaxNumIbcMergeCand > 1 ) | |
|       mvp_l0_flag[ x0 ][ y0 ] | ae(v) |
|     if( sps_amvr_enabled_flag && | |
|       ( MvdL0[ x0 ][ y0 ][ 0 ] != 0 || MvdL0[ x0 ][ y0 ][ 1 ] != 0 )) { | |
|       amvr_precision_idx[ x0 ][ y0 ] | ae(v) |
|     } | |
|   } else { | |
|     if( slice_type = = B ) | |
|       inter_pred_idc[ x0 ][ y0 ] | ae(v) |
|     if sps_affine_enabled_flag && cbWidth >= 16 && cbHeight >= 16 ) { | |
|       inter _affine_flag[ x0 ][ y0 ] | ae(v) |
|       if( sps_affine_type_flag && inter _affine_flag[ x0 ][ y0 ] ) | |
|         cu_affine_type_flag[ x0 ][ y0 ] | ae(v) |
|     } | |
|     if( sps_smvd_enabled_flag && !mvd_l1_zero_flag && | |
|       inter_pred_idc[ x0 ][ y0 ] = = PRED_BI && | |
|       !inter_affine_flag[ x0 ][ y0 ] && RefIdxSymL0 > • 1 && RefIdxSymL1 > • 1 ) | |
|       sym_mvd_flag[ x0 ][ y0 ] | ae(v) |
|     if( inter_pred_idc[ x0 ][ y0 ] != PRED_L1 ) { | |
|       if NumRefIdxActive[ 0 ] > 1 && !sym_mvd_flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if(MotionModelIdc[ x0 ][ y0 ] >1 ) | |
|         mvd_coding( x0, y0, 0, 2 ) | |
|       mvp_l0_flag[ x0 ][ y0 ] | ae(v) |

```
      } else {
        MvdL0[ x0 ][ y0 ][ 0 ] = 0
        MvdL0[ x0 ][ y0 ][ 1 ] = 0
      }
      if( inter_pred_idc[ x0 ][ y0 ] != PRED_L0 ) {
        if( NumRefIdxActive 1 ] > 1 && !sym_mvd_flag[ x0 ][ y0 ] )
          ref_idx_l1[ x0 ][ y0 ]                                                            ae(v)
        if( mvd_l1_zero_flag && inter_pred_idc[x0 ][ y0 ] = = PRED_BI ) {
          MvdL1[ x0 ][ y0 ][ 0 ] = 0
          MvdL1[ x0 ][ y0 ][ 1 ] = 0
          MvdCpL1[ x0 ][ y0 ][ 0 ][ 0 ] = 0
          MvdCpL1[ x0 ][ y0 ][ 0 ][ 1 ] = 0
          MvdCpL1[ x0 ][ y0 ][ 1 ][ 0 ] = 0
          MvdCpL1[ x0 ][ y0 ][ 1 ][ 1 ] = 0
          MvdCpL1[ x0 ][ y0 ][ 2 ][ 0 ] = 0
          MvdCpL1[ x0 ][ y0 ][ 2 ][ 1 ] = 0
        } else {
          if sym_mvd_flag x0 ][ y0 ]) {
            MvdL1[ x0 ][ y0 ][ 0 ] = • MvdL0[ x0 ][ y0 ][ 0 ]
            MvdL1[ x0 ][ y0 ][ 1 ] = • MvdL0[ x0 ][ y0 ][ 1 ]
          } else
            mvd_coding( x0, y0, 1, 0 )
          if MotionModelIdc[ x0 ][ y0 ] > 0 )
            mvd_coding( x0, y0, 1, 1 )
          if(MotionModelIdc x0 ][ y0 ] > 1 )
            mvd_coding( x0, y0, 1, 2 )
          mvp_l1_flag[ x0 ][ y0 ]                                                           ae(v)
        }
      } else {
        MvdL1[ x0 ][ y0 ][ 0 ] = 0
        MvdL1[ x0 ][ y0 ][ 1 ] = 0
      }
      if( ( sps_amvr_enabled_flag && inter_affine_flag[ x0 ][ y0 ] = = 0 &&
          ( MvdL0[ x0 ][ y0 ][ 0 ] != 0 || MvdL0[ x0 ][ y0 ][ 1 ] != 0 ||
          MvdL1[ x0 ][ y0 ][ 0 ] != 0 || MvdL1[ x0 ][ y0 ][ 1 ] != 0)) ||
          ( sps_affine_amvr_enabled_flag && inter_affine_flag[ x0 ][ y0 ] = = 1 &&
          ( MvdCpL0[ x0 ][ y0 ][ 0 ][ 0 ] !=0 || MvdCpL0[ x0 ][ y0 ][ 0 ] [ 1 ] != 0 ||
          MvdCpL1[ x0 ][ y0 ][ 0 ][ 0 ] != 0 || MvdCpL1[ x0 ][ y0 ][ 0 ][ 1 ] != 0 ||
          MvdCpL0[ x0 ][ y0 ][ 1 ][ 0 ] != 0 || MvdCpL0[ x0 ][ y0 ][ 1 ] [ 1 ] != 0 ||
          MvdCpL1[ x0 ][ y0 ][ 1 ][ 0 ] != 0 || MvdCpL1[ x0 ][ y0 ][ l ][ 1 ] != 0 ||
          MvdCpL0[ x0 ][ y0 ][ 2 ][ 0 ] != 0 || MvdCpL0[ x0 ][ y0 ][ 2 ][ 1 ] != 0 ||
          MvdCpL1[ x0 ][ y0 ][ 2 ] [ 0 ] != 0 || MvdCpL1[ x0 ][ y0 ][ 2 ][ 1 ] != 0 ) ) {
        amvr_flag[ x0 ][ y0 ]                                                               ae(v)
        if( amvr_flag[ x0 ][ y0 ] )
          amvr_precision_idx[ x0 ][ y0 ]                                                    ae(v)
      }
      if( sps_bcw_enabled_flag && inter_pred_idc[ x0 ][ y0 ] == PRED_BI &&
        luma_weight_l0_flag[ref_idx_l0 [ x0 ][ y0 ] ] = = 0 &&
        luma_weight_l1_flag[ref_idx_l1 [ x0 ][ y0 ] ] = = 0 &&
        chroma_weight_l0_flag[ ref_idx_l0 [ x0 ][ y0 ] ] = = 0 &&
        chroma_weight_l1_flag[ ref_idx_l1 [ x0 ][ y0 ] ] = = 0 &&
        cbWidth * cbHeight >= 256 )
        bcw_idx[ x0 ][ y0 ]                                                                 ae(v)
    }
  }
  if( CuPredMode[ chType ][ x0 ][ y0 ] != MODE_INTRA && !pred_mode_plt_flag &&
      general_merge_flag[ x0 ][ y0 ] = = 0 )
    cu_cbf
if( cu_cbf) {
  if(CuPredMode[chType][ x0 ][ y0 ] = = MODE_INTER && sps_sbt_enabled_flag
      && !ciip flag[ x0 ][ yo ] && !MergeTriangleFlag[ x0 ][ y0 ] ) {
    if( cbWidth <= MaxSbtSize && cbHeight <= MaxSbtSize ) {
      allowSbtVerH = cbWidth >= 8
      allowSbtVerQ = cbWidth >= 16
      allowSbtHorH = cbHeight >= 8
      allowSbtHorQ = cbHeight >= 16
      if( allowSbtVer || allowSbtHorH || allowSbtVerQ || allowSbtHorQ )
        cu_sbt_flag
    }
    if( cu_sbt_flag ) {
      if( (allowSbtVerH || allowSbtHorH ) && ( allowSbtVerQ || allowSbtHorQ) )
        cu_sbt_quad_flag
      if( ( cu_sbt_quad_flag && ( allowSbtVerQ && allowSbtHorQ ) ||
          (! cu_sbt_quad_flag && allowSbtVerH && allowSbtHorH ) )
        cu_sbt_horizontal_flag                                                              ae(v)
      cu_sbt_pos_flag                                                                       ae(v)
    }
  }
  LfnstDcOnly = 1
```

```
    LfnstZeroOutSigCoeffFlag = 1
    transform_tree( x0, y0, cbWidth, cbHeight, treeType )
    lfnstWidth = ( treeType = = DUAL_TREE_CHROMA ) ? cbWidth / SubWidthC
                                                   : cbWidth
    lfnstHeight = ( treeType = = DUAL_TREE_CHROMA) ? cbHeight / SubHeightC
                                                   : cbHeight
    if( Min( lfnstWidth, lfnstHeight) >= 4 && sps_lfnst_enabled_flag = = 1 &&
        CuPredMode[ chType ][ x0 ][ y0 ] = = MODE_INTRA &&
        IntraSubPartitionsSplitType = = ISP_NO_SPLIT &&
        ( !intra_mip_flag[ x0 ][ y0 ] || Min( lfnstWidth, lfnstHeight ) >= 16 ) &&
        tu_mts_idx[ x0 ][ y0 ] = = 0 && Max( cbWidth, cbHeight ) <= MaxTbSizeY) {
        if( LfnstDcOnly = = 0 && LfnstZeroOutSigCoeffFlag = = 1 )
            lfnst_idx[ x0 ][ y0 ]                                                   ae(v)
    }
}
```

The inventive concepts described above allows the MIP predicted coding block which has multiple transform blocks to be used. Coding efficiency may be improved when the maximum transform size is configured to a value that is smaller than the maximum intra coding block size.

Figure 12A:
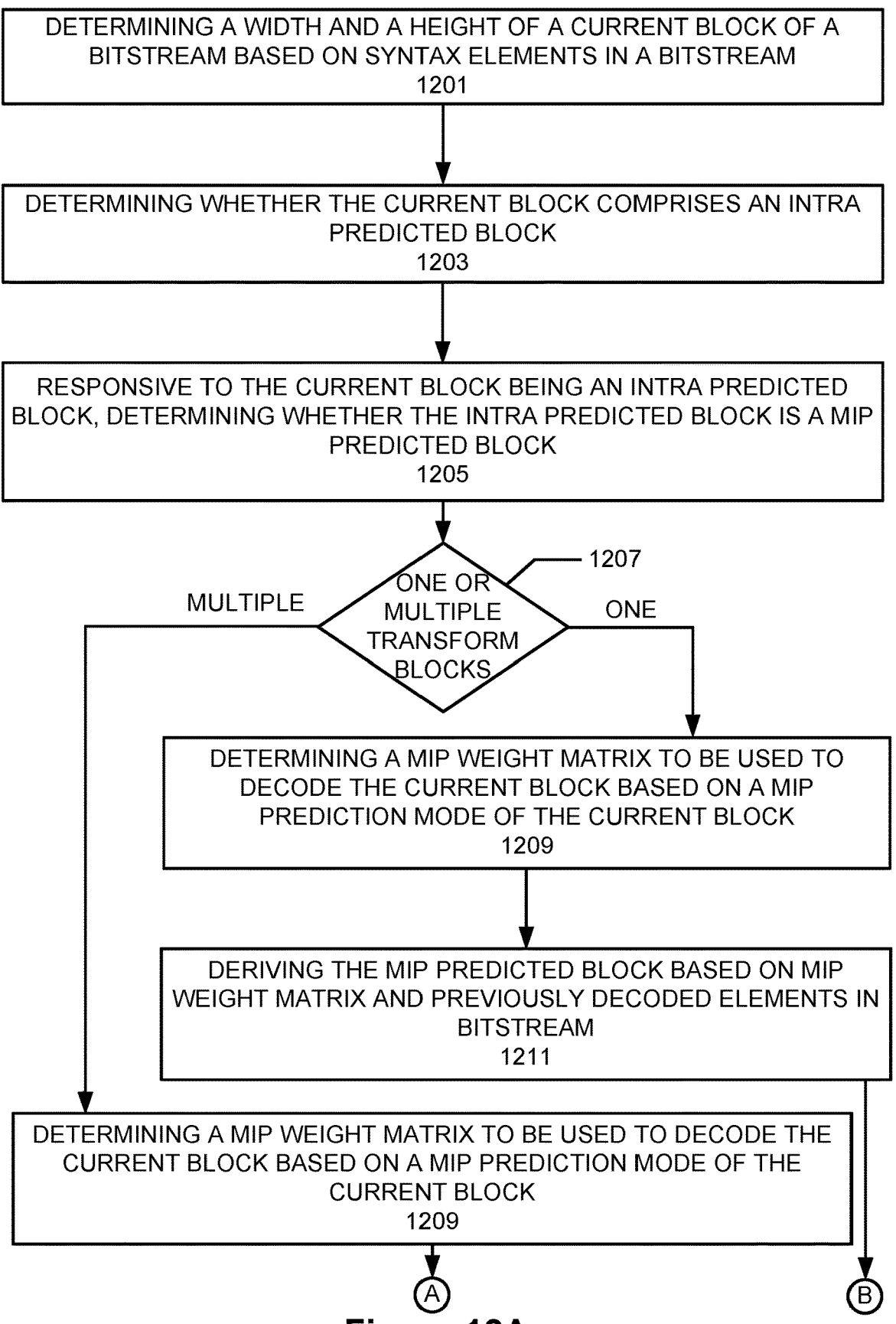
Figure 12B:
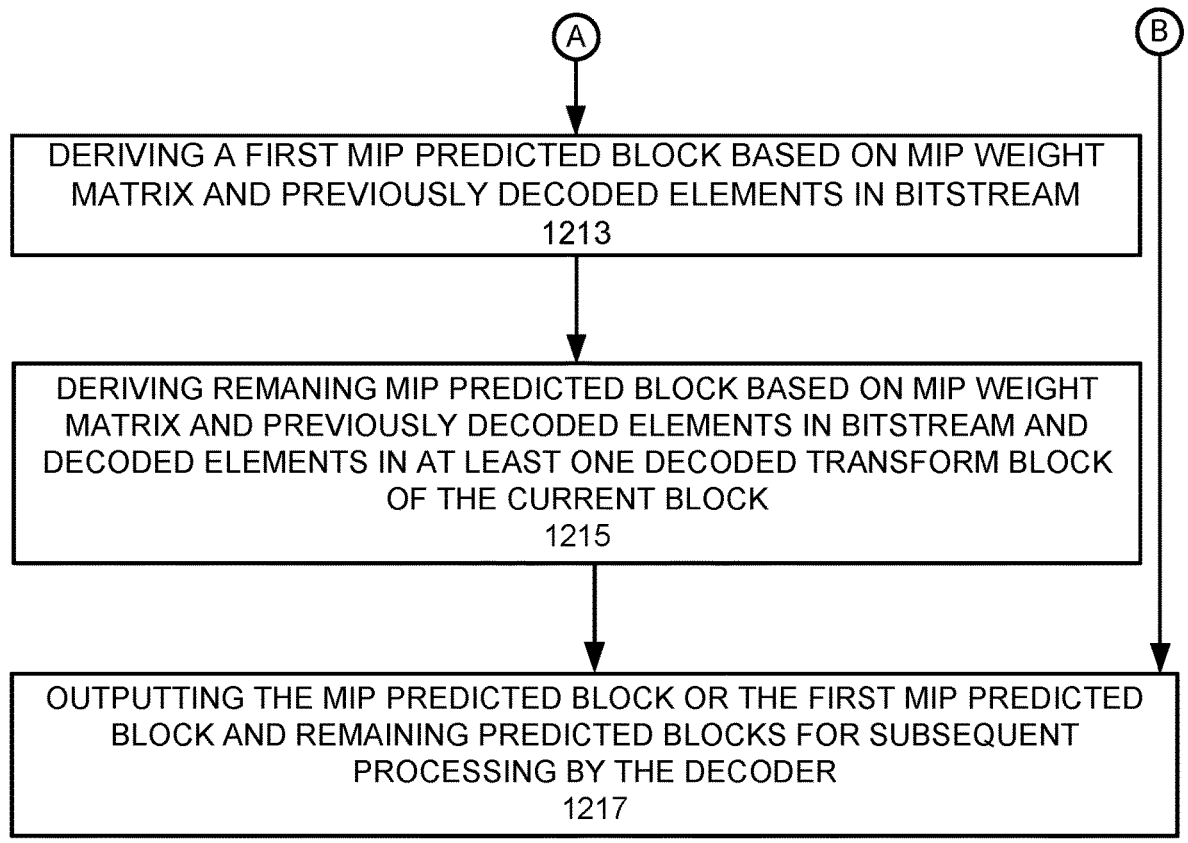

Turning now to FIG. 12, operations of a decoder shall now be described. In block 1201, the processing circuitry 1101 may determine a width and a height of a current block of a bitstream based on syntax elements in the bitstream. In block 1203, the processing circuitry 1101 may determine whether the current block is an intra predicted block. This may be done from decoding elements in the bitstream.

In block 1205, the processing circuitry 1101 may, responsive to the current block being an intra predicted block, determine whether the intra predicted block is a matrix based intra prediction (MIP) predicted block. In one embodiment, in determining whether the intra predicted block is a MIP predicted block, the processing circuitry 1101 may determine whether a syntax element indicating intra predicted block is the MIP predicted block based on at least one criteria. In another embodiment, in determining whether a syntax element indicating intra predicted block is the MIP predicted block, the processing circuitry 1101 may determine whether a syntax element indicating intra predicted block is the MIP predicted block based on the current block being the intra predicted block.

In other embodiments, in determining whether a syntax element indicating intra predicted block is the MIP predicted block, the processing circuitry 1101 may determine that the syntax element indicating intra predicted block is the MIP predicted block based on the width being less that a first parameter times the height, or the height being less that the first parameter times the width. In a further embodiment, determining that the syntax element indicating intra predicted block is the MIP predicted block is further based on the width being less than a first threshold or the height being less than the first threshold.

In block 1207, the processing circuitry 1101 may, responsive to the current block being a MIP predicted block, determine whether the MIP predicted block has one transform block or multiple transform blocks. Turning to FIG. 14, in determining whether the MIP predicted block has one transform block or multiple transform blocks, the processing circuitry 1101 in block 1401 may derive a maximum transform size from decoding elements in the bitstream. In block 1403, the processing circuitry 1101 may whether the width value is less than or equal to a maximum transform size derived from decoding elements in the bitstream and whether the height value is less than or equal to the maximum transform size. Responsive to the width value being less than or equal to the maximum transform size and the height value being less than or equal to the maximum transform size, the processing circuitry 1101 may determine in block 1405 that there is one transform block with a width nTbW equal to the width value and a height nTbH equal to the height value. Responsive to the width value being greater than the maximum transform size or the height value being greater than the maximum transform size, the processing circuitry 1101 may determine that there are multiple transform blocks, each having a width nTbW equal to a minimum of the width value and the maximum transform size and a height nTbH equal to a minimum of the height value and the maximum transform size.

In block 1209, the processing circuitry 1101 may, determine a MIP weight matrix to be used to decode the current block based on the width and height of the current block and a MIP prediction mode of the current block.

In block 1211, the processing circuitry 1101 may, responsive to determining that the MIP predicted block has one transform block, derive the MIP predicted block based on the MIP weight matrix and previously decoded elements in the bitstream.

In block 1213, the processing circuitry 1101 may, responsive to determining that the MIP block has multiple transform blocks, derive a first MIP predicted block based on the MIP weight matrix and previously decoded elements in the bitstream. In block 1215, the processing circuitry 1101 may derive remaining MIP predicted blocks based on the MIP weight matrix and previously decoded elements in the bitstream and decoded elements in at least one decoded transform block of the current block.

In block 1217, the processing circuitry 1101 may output the MIP predicted block or the first MIP predicted block and remaining predicted blocks for subsequent processing by the decoder.

Figure 13A:
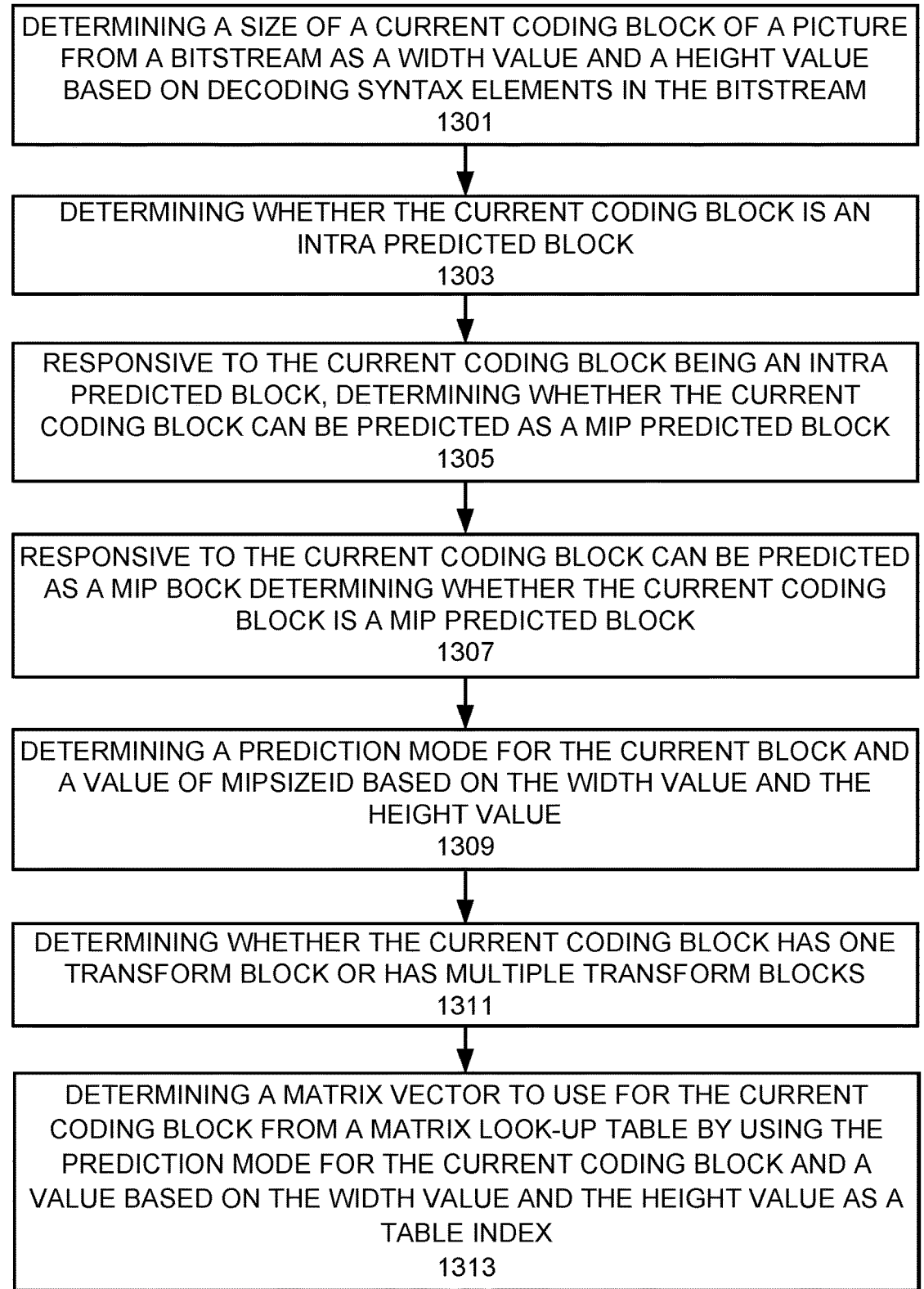
Figure 13B:
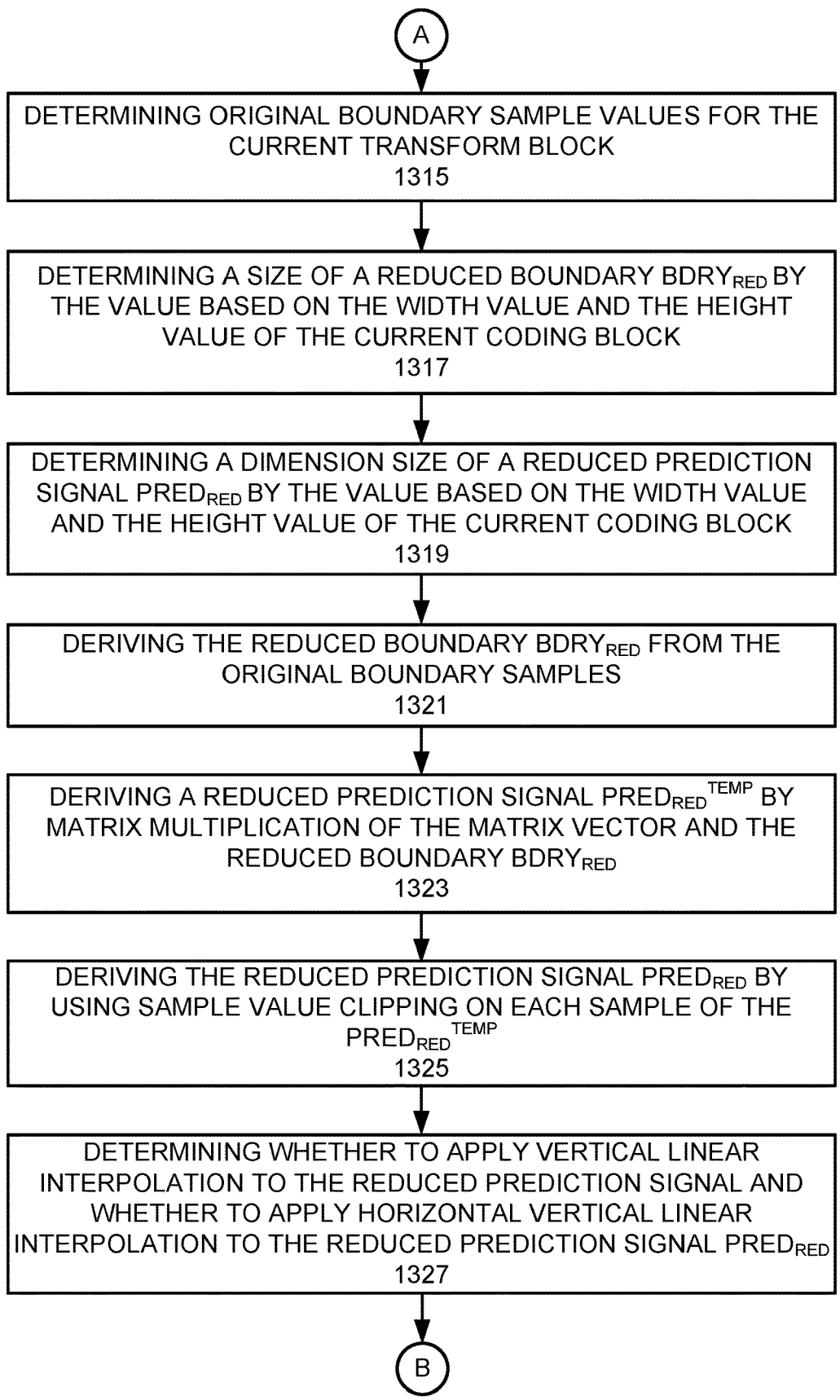
Figure 13C:
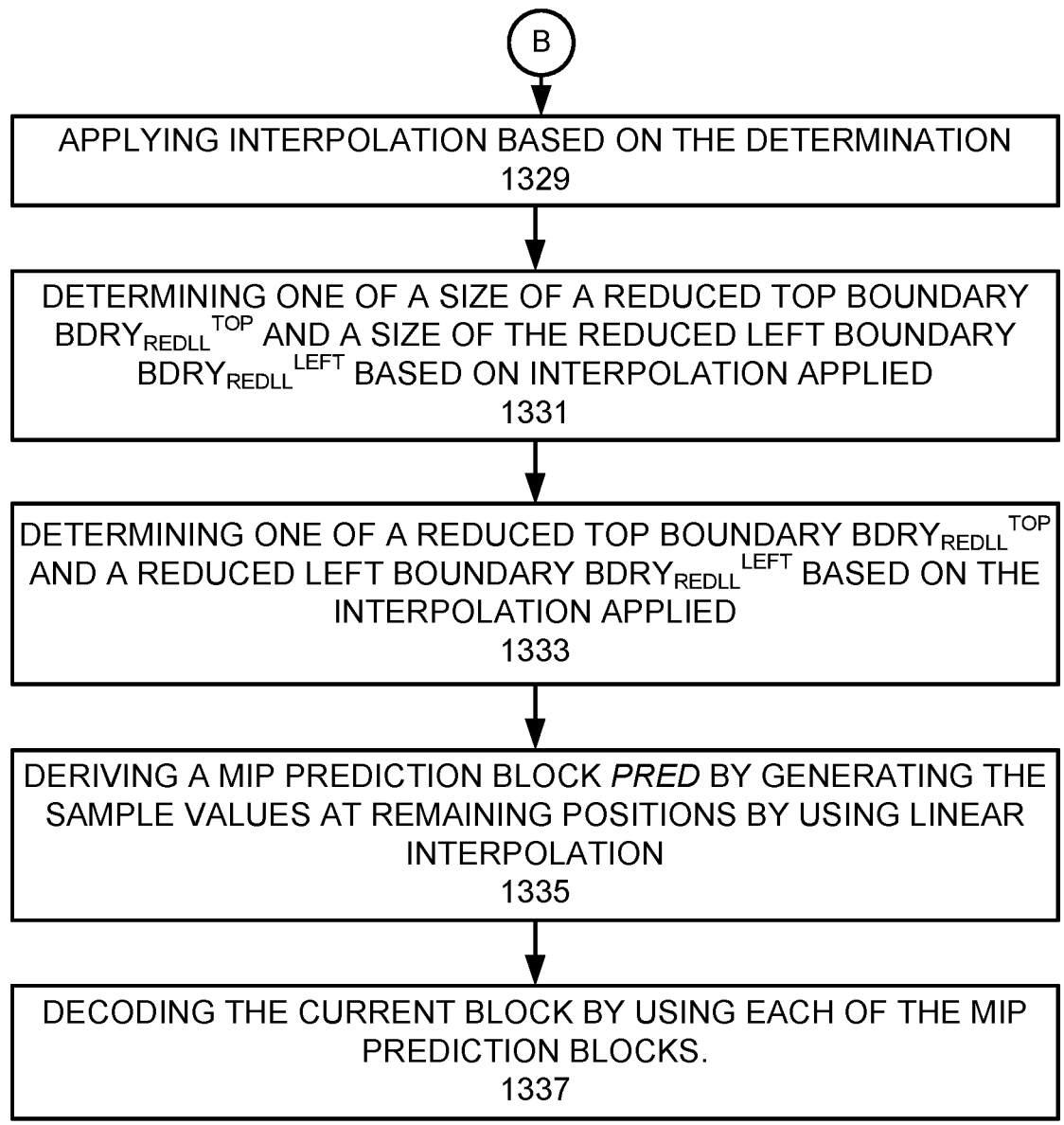

Turning now to FIG. 13, in another embodiment, the processing circuitry 1101 of the decoder may, in block 1301, derive a size of a current coding block of a picture from a bitstream as a width value and a height value based on decoding syntax elements in the bitstream.

In block 1303, the processing circuitry 1101 may determine whether the current coding block is an intra predicted block from decoding elements in the bitstream. Responsive to the current coding block being an intra predicted block, the processing circuitry 1101 may in block 1305, determine whether the coding current block can be predicted as a MIP predicted block size.

In block 1307, the processing circuitry 1101 may, responsive to the current coding block being an intra predicted block, determine whether the current coding block is a MIP predicted block from decoding elements in the bitstream.

In block 1309, the processing circuitry 1101 may determine the prediction mode for the current coding block and a value of mipSizeID (described above) based on the width value and the height value, wherein the width value and the height value specifies the width and height of the transform block as a table index.

In block 1311, the processing circuitry 1101 may determine whether the current coding block has one transform block or has multiple transform blocks. In one embodiment illustrated in FIG. 14, the processing circuitry 1101 in block 1401 may derive a maximum transform size from decoding elements in the bitstream. For example, the maximum transform size may be a parameter in the bitstream. In block 1403, the processing circuitry 1101 may determine whether the current block has one transform block or has multiple transform blocks by determining in block 1403 whether the width value is less than or equal to a maximum transform size derived from decoding elements in the bitstream and whether the height value is less than or equal to the maximum transform size. Responsive to the width value being less than or equal to the maximum transform size and the height value being less than or equal to the maximum transform size, the processing circuitry 1101 in block 1405 may determine that there is one transform block with a width nTbW equal to the width and a height nTbH equal to the height. Responsive to the width value being greater than the maximum transform size and the height value being greater than the maximum transform size, the processing circuitry 1101 in block 1407 may determine that there are multiple transform blocks, each having a width nTbW equal to a minimum of the width value and the maximum transform size and a height nTbH equal to a minimum of the height value and the maximum transform size.

Returning to FIG. 13, in block 1313, the processing circuitry 1101 may determine a matrix vector to use for the current coding block from a matrix vector look-up table by using the prediction mode for the current coding block and the value based on the width value and the height value of the current coding block as a table index.

In block 1315, the processing circuitry 1101 may determine original boundary sample values for the current transform (or prediction) block. In one embodiment, the processing circuitry 1101 may determine the original boundary sample values by determining nTBW samples from nearest neighboring samples to above of the current transform block and nTbH samples from the nearest neighboring samples to left of the current transform block In block 1317, the processing circuitry 1101 may determine a size of a reduced boundary $bdry_{red}$ by the value based on the width value and the height value of the current coding block. In block 1319, the processing circuitry may determine a dimension size of a reduced prediction signal $pred_{red}$ by the value based on the width value and the height value of the current coding block.

In block 1321, the processing circuitry 1101 may derive the reduced boundary $bdry_{red}$ from the original boundary samples. In block 1323, the processing circuitry 1101 may derive a reduced prediction signal $pred_{red}^{temp}$ by matrix multiplication of the matrix vector and the reduced boundary $bdry_{red}$. In block 1325, the processing circuitry 1101 may derive the reduced prediction signal $pred_{red}$ by using sample value clipping on each sample of the $pred_{red}^{temp}$.

In block 1327, the processing circuitry 1101 may determine whether to apply vertical linear interpolation to the reduced prediction signal $pred_{red}$ and whether to apply horizontal linear interpolation to the reduced prediction signal $pred_{red}$. In determining whether to apply vertical linear interpolation to the reduced prediction signal $pred_{red}$ and whether to apply horizontal linear interpolation to the reduced prediction signal $pred_{red}$, the processing circuitry 1101 may determine whether to apply the vertical linear interpolation to the reduced prediction signal $pred_{red}$ by the width nTbW and the height nTbH of the current transform block and whether to apply the horizontal linear interpolation to the reduced prediction signal $pred_{red}$ by the width nTbW and the height nTbH of the current transform block.

Figure 15:
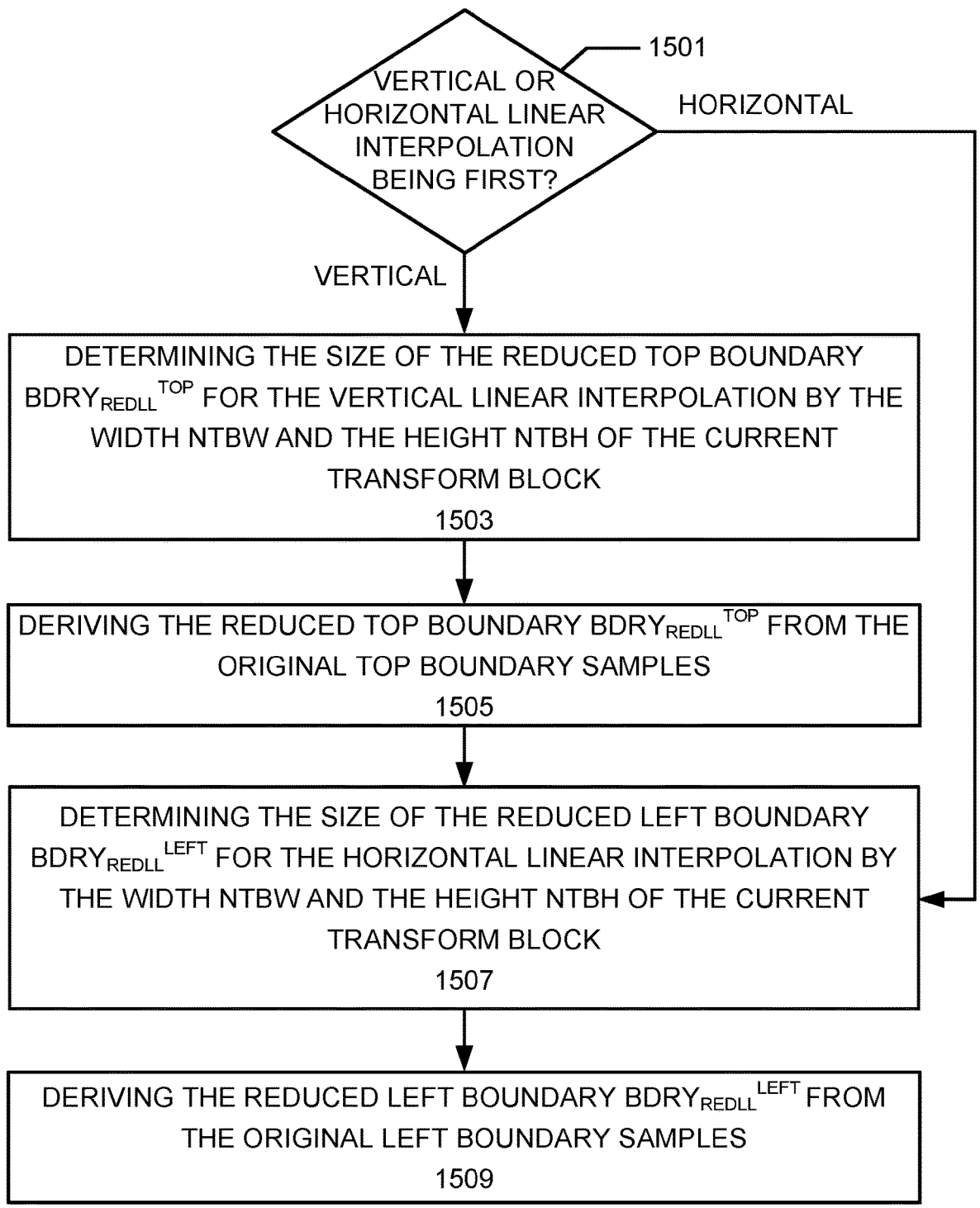

In block 1329, the processing circuitry 110 may apply interpolation based on the determination of whether to apply vertical linear interpolation to the reduced prediction signal $pred_{red}$ and whether to apply horizontal linear interpolation to the reduced prediction signal $pred_{red}$. Turning to FIG. 15, responsive to applying vertical linear interpolation first in block 1501, the processing circuitry 1101 may determine the size of the reduced top boundary $bdry_{redII}^{top}$ for the vertical linear interpolation by the width nTbW and the height nTbH of the current transform block in block 1503 and derive the reduced top boundary $bdry_{redII}^{top}$ from the original top boundary samples in block 1505.

Responsive to the applying horizontal linear interpolation first in block 1501, the processing circuitry 1101 may determine the size of the reduced left boundary $bdry_{redII}^{left}$ for the horizontal linear interpolation by the width nTbW and the height nTbH of the current transform block in block 1507 and derive the reduced left boundary $bdry_{redII}^{left}$ from the original left boundary samples in block 1509.

Returning to FIG. 13, in block 1331, the processing circuitry 1101 may determine one of a size of a reduced top boundary $bdry_{redII}^{top}$ and a size of the reduced left boundary $bdry_{redII}^{left}$ based on interpolation applied. In block 1333, the processing circuitry 1101 may determine one of reduced top boundary $bdry_{redII}^{top}$ and reduced left boundary $bdry_{redII}^{left}$ based on the interpolation applied.

In block 1335, the processing circuitry 1101 may derive a MIP prediction block pred by generating the sample values at remaining positions by using linear interpolation.

In block 1337, the processing circuitry 1101 may decode the current block by using each of the MIP prediction blocks.

Listing of Embodiments:

Embodiment 1. A method performed by a processor of a decoder, the method comprising:
- determining (1201) a width and a height of a current block of a bitstream based on syntax elements in the bitstream;
- determining (1203) whether the current block is an intra predicted block;
- responsive to the current block being an intra predicted block, determining (1205) whether the intra predicted block is a matrix based intra prediction, MIP, predicted block;
- responsive to the current block being a MIP predicted block, determining (1209) a MIP weight matrix to be used to decode the current block based on the width and height of the current block and a MIP prediction mode of the current block;
- determining (1207) whether the MIP predicted block has one transform block or multiple transform blocks;
- responsive to determining that the MIP predicted block has one transform block:
  - deriving (1211) the MIP predicted block based on the MIP weight matrix and previously decoded elements in the bitstream; and responsive to determining that the MIP block has multiple transform blocks:
  deriving (1213) a first MIP predicted block based on the MIP weight matrix and previously decoded elements in the bitstream; and
  deriving (1215) remaining MIP predicted blocks based on the MIP weight matrix and previously decoded elements in the bitstream and decoded elements in at least one decoded transform block of the current block; and
outputting (1217) the MIP predicted block or the first MIP predicted block and remaining predicted blocks for subsequent processing by the decoder.

Embodiment 2. The method of Embodiment 1 wherein determining whether the intra predicted block is a MIP predicted block comprises determining whether a syntax element indicating intra predicted block is the MIP predicted block based on at least one criteria.

Embodiment 3. The method of Embodiment 2 wherein determining whether a syntax element indicating intra predicted block is the MIP predicted block comprises determining whether a syntax element indicating intra predicted block is the MIP predicted block based on the current block being the intra predicted block.

Embodiment 4. The method of Embodiment 2 wherein determining whether a syntax element indicating intra predicted block is the MIP predicted block comprises determining that the syntax element indicating intra predicted block is the MIP predicted block based on:
  the width being less that a first parameter times the height; or
  the height being less that the first parameter times the width.

Embodiment 5. The method of Embodiment 4 wherein determining that the syntax element indicating intra predicted block is the MIP predicted block is further based on:
  the width being less than a first threshold; or
  the height being less than the first threshold.

Embodiment 6. The method of any of Embodiments 1~4 wherein determining (1209) whether the MIP predicted block has one transform block or multiple transform blocks comprises:
  deriving a maximum transform size from decoding elements in the bitstream; and
  determining the MIP predicted block has one transform block responsive to the width being equal to or less than the maximum transform size and the height being equal to or less than the maximum transform size.

Embodiment 7. A method performed by a processor of a decoder, the method comprising:
  deriving (1301) a size of a current coding block of a picture from a bitstream as a width value and a height value based on decoding syntax elements in the bitstream;
  determining (1303) whether the current coding block is an intra predicted block from decoding elements in the bitstream;
  responsive to the current coding block being an intra predicted block, determining (1305) whether the current coding block can be predicted as a MIP predicted block size;
  responsive to determining that the current coding block can be predicted as a MIP block, determining (1307) whether the current coding block is a MIP predicted block from decoding elements in the bitstream;
  determining (1313) a matrix vector to use for the current coding block from a matrix vector look-up table by using a prediction mode for the current coding block and a value based on the width value and the height value of the current coding block as a table index;
  determining (1311) whether the current coding block has one transform block or has multiple transform blocks;
  for the one transform block or each of the multiple transform blocks:
    determining (1315) original boundary sample values for the current transform block;
    determining (1317) a size of a reduced boundary $bdry_{red}$ by the value based on the width value and the height value of the current coding block;
    determining (1319) a dimension size of a reduced prediction signal $pred_{red}$ by the value based on the width value and the height value of the current coding block;
    deriving (1321) the reduced boundary $bdry_{red}$ from the original boundary samples;
    deriving (1323) a reduced prediction signal $pred_{red}^{temp}$ by matrix multiplication of the matrix vector and the reduced boundary $bdry_{red}$;
    deriving (1325) the reduced prediction signal $pred_{red}$ by using sample value clipping on each sample of the $pred_{red}^{temp}$;
    determining (1327) whether to apply vertical linear interpolation to the reduced prediction signal $pred_{red}$ and whether to apply horizontal linear interpolation to the reduced prediction signal $pred_{red}$;
    applying (1329) interpolation based on the determination of whether to apply vertical linear interpolation to the reduced prediction signal $pred_{red}$ and whether to apply horizontal linear interpolation to the reduced prediction signal $pred_{red}$; and
    determining (1331) one of a size of a reduced top boundary $bdry_{redII}^{top}$ and a size of the reduced left boundary $bdry_{redII}^{left}$ based on interpolation applied;
    determining (1333) one of reduced top boundary $bdry_{redII}^{top}$ and reduced left boundary $bdry_{redII}^{left}$ based on the interpolation applied; and
    deriving (1335) a MIP prediction block pred by generating the sample values at remaining positions by using linear interpolation; and
  decoding (1337) the current coding block by using each of the MIP prediction blocks.

Embodiment 8. The method of Embodiment 7, wherein determining (1313) whether the current block has one transform block or has multiple transform block comprises:
  deriving (1401) a maximum transform size from decoding elements in the bitstream;
  determining (1403) whether the width value is less than or equal to a maximum transform size derived from decoding elements in the bitstream and whether the height value is less than or equal to the maximum transform size;
  responsive to the width value being less than or equal to the maximum transform size and the height value being less than or equal to the maximum transform size, determining (1405) that there is one transform block with a width nTbW equal to the width and a height nTbH equal to the height;
  responsive to the width value being greater than the maximum transform size and the height value being greater than the maximum transform size, determining (1407) that there are multiple transform blocks, each having a width nTbW equal to a minimum of the width value and the maximum transform size and a height nTbH equal to a minimum of the height value and the maximum transform size.

Embodiment 9. The method of Embodiment 8 wherein determining (1315) the original boundary sample values comprises determining nTbW samples from nearest neighboring samples to above of the current transform block and nTbH samples from the nearest neighboring samples to left of the current transform block.

Embodiment 10. The method of any of Embodiments 8-9 wherein determining (1327) whether to apply the vertical linear interpolation to the reduced prediction signal $pred_{red}$ and whether to apply the horizontal linear interpolation to the reduced prediction signal $pred_{red}$ comprises determining whether to apply the vertical linear interpolation to the reduced prediction signal $pred_{red}$ by the width nTbW and the height nTbH of the current transform block and whether to apply the horizontal linear interpolation to the reduced prediction signal $pred_{red}$ by the width nTbW and the height nTbH of the current transform block.

Embodiment 11. The method of Embodiment 10, further comprising:
responsive to the decision being to apply both vertical and horizontal linear interpolations, determining (1501) which linear interpolation direction to apply first;
responsive to the decision being to first apply vertical linear interpolation:
determining (1503) the size of the reduced top boundary $bdry_{redII}^{top}$ for the vertical linear interpolation by the width nTbW and the height nTbH of the current transform block; and
deriving (1505) the reduced top boundary $bdry_{redII}^{top}$ from the original top boundary samples.
responsive to the decision being to first apply horizontal linear interpolation:
determining (1507) the size of the reduced left boundary $bdry_{redII}^{left}$ for the horizontal linear interpolation by the width nTbW and the height nTbH of the current transform block; and
deriving (1509) the reduced left boundary $bdry_{redII}^{left}$ from the original left boundary samples.

Embodiment 12. The method of any of Embodiments 7 to 11 further comprising determining (1309) the prediction mode for the current coding block and the value based on the width value and the height value as a table index.

Embodiment 13. A decoder for a communication network, the decoder (906) comprising:
a processor (1101); and
memory (1103) coupled with the processor, wherein the memory comprises instructions that when executed by the processor cause the processor to perform operations according to any of Embodiments 1-12.

Embodiment 14. A computer program comprising computer-executable instructions configured to cause a device to perform the method according to any one of Embodiments 1-12, when the computer-executable instructions are executed on a processor (1101) comprised in the device.

Embodiment 15. A computer program product comprising a computer-readable storage medium (1103), the computer-readable storage medium having computer-executable instructions configured to cause a device to perform the method according to any one of Embodiments 1-12. when the computer-executable instructions are executed on a processor (1101) comprised in the device.

Embodiment 16. An apparatus comprising:
at least one processor (1101);
memory (1103) communicatively coupled to the processor, said memory comprising instructions executable by the processor, which cause the processor to perform operations comprising operations according to any of Embodiments 1-12.

17. A decoder adapted to perform operations comprising:
determining (1201) a width and a height of a current block of a bitstream based on syntax elements in the bitstream;
determining (1203) whether the current block is an intra predicted block;
responsive to the current block being an intra predicted block, determining (1205) whether the intra predicted block is a matrix based intra prediction, MIP, predicted block;
responsive to the current block being a MIP predicted block, determining (1209) a MIP weight matrix to be used to decode the current block based on the width and height of the current block and a MIP prediction mode of the current block;
determining (1207) whether the MIP predicted block has one transform block or multiple transform blocks;
responsive to determining that the MIP predicted block has one transform block:
deriving (1211) the MIP predicted block based on the MIP weight matrix and previously decoded elements in the bitstream; and
responsive to determining that the MIP block has multiple transform blocks:
deriving (1213) a first MIP predicted block based on the MIP weight matrix and previously decoded elements in the bitstream;
deriving (1215) remaining MIP predicted blocks based on the MIP weight matrix and previously decoded elements in the bitstream and decoded elements in at least one decoded transform block of the current block; and
outputting (1217) the MIP predicted block or the first MIP predicted block and remaining predicted blocks for subsequent processing by the decoder.

Embodiment 18. The decoder of Embodiment 17 wherein in determining whether the intra predicted block is a MIP predicted block, the decoder is adapted to perform operations comprising determining whether a syntax element indicating intra predicted block is the MIP predicted block based on at least one criteria.

Embodiment 19. The decoder of Embodiment 18 wherein in determining whether a syntax element indicating intra predicted block is the MIP predicted block, the decoder is adapted to perform operations comprising determining whether a syntax element indicating intra predicted block is the MIP predicted block based on the current block being the intra predicted block.

Embodiment 20. The decoder of Embodiment 18 wherein in determining whether a syntax element indicating intra predicted block is the MIP predicted block, the decoder is adapted to perform operations comprising determining that the syntax element indicating intra predicted block is the MIP predicted block based on:
the width being less that a first parameter times the height; or
the height being less that the first parameter times the width.

Embodiment 21. The decoder of Embodiment 20 wherein determining that the syntax element indicating intra predicted block is the MIP predicted block is further based on:
   the width being less than a first threshold; or
   the height being less than the first threshold.

Embodiment 22. The decoder of any of Embodiments 1-20 wherein in determining (1209) whether the MIP predicted block has one transform block or multiple transform blocks, the decoder is adapted to perform operations comprising:
   deriving a maximum transform size from decoding elements in the bitstream; and
   determining the MIP predicted block has one transform block responsive to the width being equal to or less than the maximum transform size and the height being equal to or less than the maximum transform size.

Embodiment 23. A decoder adapted to perform operations comprising:
   deriving (1301) a size of a current coding block of a picture from a bitstream as a width value and a height value based on decoding syntax elements in the bitstream;
   determining (1303) whether the current coding block is an intra predicted block from decoding elements in the bitstream;
   responsive to the current coding block being an intra predicted block, determining (1305) whether the current coding block can be predicted as a MIP predicted block size;
   responsive to determining that the current coding block can be predicted as a MIP block, determine (1307) whether the current coding block is a MIP predicted block from decoding elements in the bitstream;
   determining (1313) a matrix vector to use for the current coding block from a matrix vector look-up table by using a prediction mode for the current coding block and a value based on the width value and the height value of the current coding block as a table index;
   determining (1311) whether the current coding block has one transform block or has multiple transform blocks;
   for the one transform block or each of the multiple transform blocks:
      determining (1315) original boundary sample values for the current transform block;
      determining (1317) a size of a reduced boundary $bdry_{red}$ by the value based on the width value and the height value of the current coding block;
      determining (1319) a dimension size of a reduced prediction signal $pred_{red}$ by the value based on the width value and the height value of the current coding block;
      deriving (1321) the reduced boundary $bdry_{red}$ from the original boundary samples;
      deriving (1323) a reduced prediction signal $pred_{red}^{temp}$ by matrix multiplication of the matrix vector and the reduced boundary $bdry_{red}$;
      deriving (1325) the reduced prediction signal $pred_{red}$ by using sample value clipping on each sample of the $pred_{red}^{temp}$;
      determining (1327) whether to apply vertical linear interpolation to the reduced prediction signal $pred_{red}$ and whether to apply horizontal linear interpolation to the reduced prediction signal $pred_{red}$;
      applying (1329) interpolation based on the determination of whether to apply vertical linear interpolation to the reduced prediction signal $pred_{red}$ and whether to apply horizontal linear interpolation to the reduced prediction signal $pred_{red}$; and
      determining (1331) one of a size of a reduced top boundary $bdry_{redII}^{top}$ and a size of the reduced left boundary $bdry_{redII}^{left}$ based on interpolation applied;
      determining (1333) one of reduced top boundary $bdry_{redII}^{top}$ and reduced left boundary $bdry_{redII}^{left}$ based on the interpolation applied; and
      deriving (1335) a MIP prediction block pred by generating the sample values at remaining positions by using linear interpolation; and
   decoding (1337) the current block by using each of the MIP prediction blocks.

Embodiment 24. The decoder of Embodiment 23, wherein determining (1313) whether the current block has one transform block or has multiple transform block comprises:
   deriving (1401) a maximum transform size from decoding elements in the bitstream;
   determining (1403) whether the width value is less than or equal to a maximum transform size derived from decoding elements in the bitstream and whether the height value is less than or equal to the maximum transform size;
   responsive to the width value being less than or equal to the maximum transform size and the height value being less than or equal to the maximum transform size, determining (1405) that there is one transform block with a width nTbW equal to the width and a height nTbH equal to the height;
   responsive to the width value being greater than the maximum transform size and the height value being greater than the maximum transform size, determining (1407) that there are multiple transform blocks, each having a width nTbW equal to a minimum of the width value and the maximum transform size and a height nTbH equal to a minimum of the height value and the maximum transform size.

Embodiment 25. The decoder of Embodiment 24 wherein in determining (1315) the original boundary sample values, the decoder is adapted to perform operations comprising determining nTbW samples from nearest neighboring samples to above of the current transform block and nTbH samples from the nearest neighboring samples to left of the current transform block.

Embodiment 26. The decoder of any of Embodiments 23-25 wherein in determining (1327) whether to apply the vertical linear interpolation to the reduced prediction signal $pred_{red}$ and whether to apply the horizontal linear interpolation to the reduced prediction signal $pred_{red}$, the decoder is adapted to perform operations comprising determining whether to apply the vertical linear interpolation to the reduced prediction signal $pred_{red}$ by the width nTbW and the height nTbH of the current transform block and whether to apply the horizontal linear interpolation to the reduced prediction signal $pred_{red}$ by the width nTbW and the height nTbH of the current transform block.

Embodiment 27. The decoder of Embodiment 26, wherein the decoder is adapted to perform further operations comprising:
   responsive to the decision being to apply both vertical and horizontal linear interpolations, determining (1501) which linear interpolation direction to apply first;
   responsive to the decision being to first apply vertical linear interpolation:
      determining (1503) the size of the reduced top boundary $bdry_{redII}^{top}$ for the vertical linear interpolation by the width nTbW and the height nTbH of the current transform block; and deriving (1505) the reduced top boundary $bdry_{redll}^{top}$ from the original top boundary samples.

responsive to the decision being to first apply horizontal linear interpolation:

determining (1507) the size of the reduced left boundary $bdry_{redll}^{left}$ for the horizontal linear interpolation by the width nTbW and the height nTbH of the current transform block; and deriving (1509) the reduced left boundary $bdry_{redll}^{left}$ from the original left boundary samples.

Embodiment 28. The decoder of any of Embodiments 23 to 27 wherein the decoder is adapted to perform further operations comprising determining (1309) the prediction mode for the current coding block and the value based on the width value and the height value as a table index.

Abbreviations

| Abbreviation | Explanation |
| --- | --- |
| HEVC | High Efficiency Video Coding |
| JVET | Joint Video Exploratory Team |
| VVC | Versatile Video Coding |
| ITU-T | International Telecommunications Union-Telecommunication Standardization Sector |
| MPEG | Moving Picture Experts Group |
| CU | Coding Unit |
| MIP | Matrix based Intra Prediction |

REFERENCES

JVET-O2001-vE: Versatile Video Coding (Draft 6); B. Bross, J. Chen, S. Liu

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a processor of a decoder, the method comprising:
   determining a width and a height of a current block of a bitstream based on syntax elements in the bitstream;
   determining whether the current block is an intra predicted block;
   responsive to the current block being an intra predicted block, determining whether the intra predicted block is a matrix based intra prediction, MIP, predicted block;
   responsive to the current block being a MIP predicted block, determining whether the MIP predicted block has one transform block or multiple transform blocks;
   determining a MIP weight matrix to be used to decode the current block based on a MIP prediction mode of the current block;
   responsive to determining that the MIP predicted block has one transform block:
      deriving the MIP predicted block based on the MIP weight matrix and previously decoded elements in the bitstream; and
   responsive to determining that the MIP predicted block has multiple transform blocks:
      deriving a first MIP predicted block based on the MIP weight matrix and previously decoded elements in the bitstream; and
      deriving remaining MIP predicted blocks based on the MIP weight matrix and previously decoded elements in the bitstream and decoded elements in at least one decoded transform block of the current block; and
   outputting the MIP predicted block or the first MIP predicted block and remaining predicted blocks for subsequent processing by the decoder.

2. The method of claim 1, wherein determining whether the intra predicted block is a MIP predicted block comprises determining whether a syntax element indicating intra predicted block is the MIP predicted block based on the current block being the intra predicted block.

3. The method of claim 1, wherein determining whether the MIP predicted block has one transform block or multiple transform blocks comprises:
   deriving a maximum transform size from decoding elements in the bitstream;
   determining whether the width value is less than or equal to a maximum transform size derived from decoding elements in the bitstream and whether the height value is less than or equal to the maximum transform size;
   responsive to the width value being less than or equal to the maximum transform size and the height value being less than or equal to the maximum transform size, determining that there is one transform block with a width nTbW equal to the width value and a height nTbH equal to the height value;
   responsive to the width value being greater than the maximum transform size or the height value being greater than the maximum transform size, determining that there are multiple transform blocks, each having a width nTbW equal to a minimum of the width value and the maximum transform size and a height nTbH equal to a minimum of the height value and the maximum transform size.

4. A computer program product comprising a non-transitory computer-readable storage medium, the computer-readable storage medium having computer-executable instructions configured to cause a device to perform the method according to claim 1 when the computer-executable instructions are executed on a processor comprised in the device.

5. A method performed by a processor of a decoder, the method comprising:
deriving a size of a current coding block of a picture from a bitstream as a width value and a height value based on decoding syntax elements in the bitstream;
determining whether the current coding block is an intra predicted block from decoding elements in the bitstream;
responsive to the current coding block being an intra predicted block, determining whether the current coding block is a MIP predicted block from decoding elements in the bitstream;
determining whether the current coding block has one transform block or has multiple transform blocks;
determining a matrix vector to use for the current coding block from a matrix vector look-up table by using a prediction mode for the current coding block and a value based on the width value and the height value of the current coding block as a table index;
for the one transform block or each of the multiple transform blocks:
determining original boundary sample values for the current transform block;
determining a size of a reduced boundary $bdry_{red}$ by the value based on the width value and the height value of the current coding block;
determining a dimension size of a reduced prediction signal $pred_{red}$ by the value based on the width value and the height value of the current coding block;
deriving the reduced boundary $bdry_{red}$ from the original boundary sample values;
deriving a reduced prediction signal, $pred_{red}^{temp}$, by matrix multiplication of the matrix vector and the reduced boundary $bdry_{red}$;
deriving the reduced prediction signal $pred_{red}$ by using sample value clipping on each sample of the $pred_{red}^{temp}$;
determining whether to apply vertical linear interpolation to the reduced prediction signal $pred_{red}$ and whether to apply horizontal linear interpolation to the reduced prediction signal $pred_{red}$;
applying interpolation based on the determination of whether to apply vertical linear interpolation to the reduced prediction signal $pred_{red}$ and whether to apply horizontal linear interpolation to the reduced prediction signal $pred_{red}$; and
determining one of a size of a reduced top boundary $bdry_{redII}^{top}$ and a size of a reduced left boundary $bdry_{redII}^{left}$ based on interpolation applied;
determining one of reduced top boundary $bdry_{redII}^{top}$ and reduced left boundary $bdry_{red}^{left}$ based on the interpolation applied; and
deriving a MIP prediction block pred by generating the sample values at remaining positions by using linear interpolation; and
decoding the current coding block by using each of the MIP prediction blocks.

6. The method of claim 5, wherein determining whether the current coding block has one transform block or has multiple transform block comprises:
deriving a maximum transform size from decoding elements in the bitstream;
determining whether the width value is less than or equal to a maximum transform size derived from decoding elements in the bitstream and whether the height value is less than or equal to the maximum transform size;
responsive to the width value being less than or equal to the maximum transform size and the height value being less than or equal to the maximum transform size, determining that there is one transform block with a width nTbW equal to the width value and a height nTbH equal to the height value;
responsive to the width value being greater than the maximum transform size or the height value being greater than the maximum transform size, determining that there are multiple transform blocks, each having a width nTbW equal to a minimum of the width value and the maximum transform size and a height nTbH equal to a minimum of the height value and the maximum transform size.

7. The method of claim 6, wherein determining the original boundary sample values comprises determining nTbW samples from nearest neighboring samples to above of the current transform block and nTbH samples from the nearest neighboring samples to left of the current transform block.

8. The method of claim 6, wherein determining whether to apply the vertical linear interpolation to the reduced prediction signal $pred_{red}$ and whether to apply the horizontal linear interpolation to the reduced prediction signal $pred_{red}$ comprises determining whether to apply the vertical linear interpolation to the reduced prediction signal $pred_{red}$ by the width nTbW and the height nTbH of the current transform block and whether to apply the horizontal linear interpolation to the reduced prediction signal $pred_{red}$ by the width nTbW and the height nTbH of the current transform block.

9. The method of claim 8, further comprising:
responsive to determining to apply both vertical and horizontal linear interpolations,
responsive to applying horizontal linear interpolation first:
determining the size of the reduced left boundary $bdry_{redII}^{left}$ for the horizontal linear interpolation by the width nTbW and the height nTbH of the current transform block; and
deriving the reduced left boundary $bdry_{redII}^{left}$ from original left boundary samples.

10. The method of claim 9, further comprising:
responsive to applying vertical linear interpolation first:
determining the size of the reduced top boundary $bdry_{redII}^{top}$ for the vertical linear interpolation by the width nTbW and the height nTbH of the current transform block; and
deriving the reduced top boundary $bdry_{redII}^{top}$ from original top boundary samples.

11. The method of claim 5, further comprising determining the prediction mode for the current coding block and a value of MipSizeId based on the width value and the height value, wherein the width value and the height value specifies the width and height of the transform block as a table index.

12. A decoder comprising:

a processor; and memory coupled with the processor, wherein the memory comprises instructions that, when executed by the processor, cause the processor to perform operations comprising:

determining a width and a height of a current block of a bitstream based on syntax elements in the bitstream;

determining whether the current block is an intra predicted block;

responsive to the current block being an intra predicted block, determining whether the intra predicted block is a matrix based intra prediction, MIP, predicted block;

determining whether the MIP predicted block has one transform block or multiple transform blocks;

responsive to the current block being a MIP predicted block, determining a MIP weight matrix to be used to decode the current block based on the width and height of the current block and a MIP prediction mode of the current block;

responsive to determining that the MIP predicted block has one transform block:

deriving the MIP predicted block based on the MIP weight matrix and previously decoded elements in the bitstream; and responsive to determining that the MIP predicted block has multiple transform blocks:

deriving a first MIP predicted block based on the MIP weight matrix and previously decoded elements in the bitstream; and deriving remaining MIP predicted blocks based on the MIP weight matrix and previously decoded elements in the bitstream and decoded elements in at least one decoded transform block of the current block; and outputting the MIP predicted block or the first MIP predicted block and remaining predicted blocks for subsequent processing by the decoder.

13. The decoder of claim 12, wherein in determining whether the intra predicted block is a MIP predicted block, the memory comprises instructions that, when executed by the processor, cause the processor to perform operations comprising determining whether a syntax element indicating intra predicted block is the MIP predicted block.

14. The decoder of claim 12, wherein in determining whether the MIP predicted block has one transform block or multiple transform blocks, the memory comprises instructions that, when executed by the processor, cause the processor to perform operations comprising:

deriving a maximum transform size from decoding elements in the bitstream;

determining whether the width value is less than or equal to a maximum transform size derived from decoding elements in the bitstream and whether the height value is less than or equal to the maximum transform size;

responsive to the width value being less than or equal to the maximum transform size and the height value being less than or equal to the maximum transform size, determining that there is one transform block with a width nTbW equal to the width value and a height nTbH equal to the height value;

responsive to the width value being greater than the maximum transform size and the height value being greater than the maximum transform size, determining that there are multiple transform blocks, each having a width nTbW equal to a minimum of the width value and the maximum transform size and a height nTbH equal to a minimum of the height value and the maximum transform size.

15. A decoder comprising:

a processor; and memory coupled with the processor, wherein the memory comprises instructions that, when executed by the processor, cause the processor to perform operations comprising:

deriving a size of a current coding block of a picture from a bitstream as a width value and a height value based on decoding syntax elements in the bitstream;

determining whether the current coding block is an intra predicted block from decoding elements in the bitstream;

responsive to the current coding block being an intra predicted block, determining whether the current coding block can be predicted as a matrix based intra prediction, MIP, predicted block size;

responsive to determining that the current coding block can be predicted as a MIP block, determining whether the current coding block is a MIP predicted block from decoding elements in the bitstream;

determining whether the current coding block has one transform block or has multiple transform blocks;

determining a matrix vector to use for the current coding block from a matrix vector look-up table by using a prediction mode for the current coding block and a value based on the width value and the height value of the current coding block as a table index;

for the one transform block or each of the multiple transform blocks:

determining original boundary sample values for the current transform block;

determining a size of a reduced boundary $bdry_{red}$ by the value based on the width value and the height value of the current coding block;

determining a dimension size of a reduced prediction signal $pred_{red}$ by the value based on the width value and the height value of the current coding block;

deriving the reduced boundary $bdry_{red}$ from the original boundary sample values;

deriving a reduced prediction signal, $pred_{red}^{temp}$, by matrix multiplication of the matrix vector and the reduced boundary $bdry_{red}$;

deriving the reduced prediction signal $pred_{red}$ by using sample value clipping on each sample of the $pred_{red}^{temp}$;

determining whether to apply vertical linear interpolation to the reduced prediction signal $pred_{red}$ and whether to apply horizontal linear interpolation to the reduced prediction signal $pred_{red}$;

applying interpolation based on the determination of whether to apply vertical linear interpolation to the reduced prediction signal $pred_{red}$ and whether to apply horizontal linear interpolation to the reduced prediction signal $pred_{red}$; and determining one of a size of a reduced top boundary $bdry_{redII}^{top}$ and a size of a reduced left boundary $bdry_{redII}^{left}$ based on interpolation applied;

determining one of reduced top boundary $bdry_{red}^{top}$ and reduced left boundary $bdry_{redII}^{left}$ based on the interpolation applied; and deriving a MIP prediction block pred by generating the sample values at remaining positions by using linear interpolation; and decoding the current coding block by using each of the MIP prediction blocks.

16. The decoder of claim 15, wherein in determining whether the current coding block has one transform block or has multiple transform block, the memory comprises instructions that, when executed by the processor, cause the processor to perform operations comprising:

deriving a maximum transform size from decoding elements in the bitstream;

determining whether the width value is less than or equal to a maximum transform size derived from decoding elements in the bitstream and whether the height value is less than or equal to the maximum transform size;

responsive to the width value being less than or equal to the maximum transform size and the height value being less than or equal to the maximum transform size, determining that there is one transform block with a width nTbW equal to the width value and a height nTbH equal to the height value;

responsive to the width value being greater than the maximum transform size and the height value being greater than the maximum transform size, determining that there are multiple transform blocks, each having a width nTbW equal to a minimum of the width value and the maximum transform size and a height nTbH equal to a minimum of the height value and the maximum transform size.

17. The decoder of claim 16, wherein in determining the original boundary sample values, the memory comprises instructions that, when executed by the processor, cause the processor to perform operations comprising determining nTbW samples from nearest neighboring samples to above of the current transform block and nTbH samples from the nearest neighboring samples to left of the current transform block.

18. The decoder of claim 16, wherein in determining whether to apply the vertical linear interpolation to the reduced prediction signal $pred_{red}$ and whether to apply the horizontal linear interpolation to the reduced prediction signal $pred_{red}$, the memory comprises instructions that, when executed by the processor, cause the processor to perform operations comprising determining whether to apply the vertical linear interpolation to the reduced prediction signal $pred_{red}$ by the width nTbW and the height nTbH of the current transform block and whether to apply the horizontal linear interpolation to the reduced prediction signal $pred_{red}$ by the width nTbW and the height nTbH of the current transform block.

19. The decoder of claim 18, wherein the memory comprises further instructions that, when executed by the processor, cause the processor to perform operations further comprising:

responsive to determining to apply both vertical and horizontal linear interpolations;

responsive to applying horizontal linear interpolation first:

determining the size of the reduced left boundary $bdry_{redII}^{left}$ for the horizontal linear interpolation by the width nTbW and the height nTbH of the current transform block; and deriving the reduced left boundary $bdry_{redII}^{left}$ from original left boundary samples.

20. The decoder of claim 19, wherein the memory comprises further instructions that, when executed by the processor, cause the processor to perform operations further comprising:

responsive to applying vertical linear interpolation first:

determining the size of the reduced top boundary $bdry_{redII}^{top}$ for the vertical linear interpolation by the width nTbW and the height nTbH of the current transform block; and deriving the reduced top boundary $bdry_{redII}^{top}$ from original top boundary samples.

21. The decoder of claim 15, wherein the memory comprises instructions that, when executed by the processor, cause the processor to perform operations further comprising determining the prediction mode for the current coding block and the value based on the width value and the height value as a table index.

* * * * *